US012673783B2

(12) United States Patent

Minas

(10) Patent No.: US 12,673,783 B2

(45) Date of Patent: Jul. 7, 2026

(54) HYDROGEN FUEL DISTRIBUTION SYSTEM WITH INTEGRATED THERMAL MANAGEMENT

(71) Applicant: General Electric Company, Schenectady, NY (US)

(72) Inventor: Constantinos Minas, Slingerlands, NY (US)

(73) Assignee: General Electric Company, Evendale, OH (US)

( * ) Notice: Subject to any disclaimer, the term of this patent is extended or adjusted under 35 U.S.C. 154(b) by 867 days.

(21) Appl. No.: 18/145,518

(22) Filed: Dec. 22, 2022

(65) Prior Publication Data

US 2024/0208665 A1     Jun. 27, 2024

(51) Int. Cl.
*B64D 37/30*       (2006.01)
*B60L 58/33*       (2019.01)
*B64D 37/34*       (2006.01)

(52) U.S. Cl.
CPC .............. *B64D 37/30* (2013.01); *B60L 58/33* (2019.02); *B64D 37/34* (2013.01); *B60L 2200/10* (2013.01); *B64D 2221/00* (2013.01)

(58) Field of Classification Search
None
See application file for complete search history.

(56) References Cited

U.S. PATENT DOCUMENTS 5,106,035 A     4/1992  Langford, III
6,296,957 B1   10/2001  Graage

| 8,950,195 B2 | 2/2015 | Watts | |
| 9,196,914 B2 | 11/2015 | Yoshida et al. | |
| 9,464,573 B2 * | 10/2016 | Remy | F02C 7/22 |
| 2007/0179636 A1 | 8/2007 | Shige | |
| 2022/0099299 A1 | 3/2022 | Carrotte et al. | |
| 2022/0131165 A1 * | 4/2022 | Ballantine | H01M 8/04447 |
| 2022/0364505 A1 | 11/2022 | Kim et al. | |

(Continued)

FOREIGN PATENT DOCUMENTS

| CN | 121044055 A  * | 12/2025 | F02C 7/224 |
| EP | 4082912 A1 | 11/2022 | |

(Continued)

OTHER PUBLICATIONS

European Patent Office, "Partial European Search Report," issued in connection with European Patent Application No. 23215140.7, dated Apr. 4, 2024, 12 pages.

*Primary Examiner* — Christopher P Ellis

(74) *Attorney, Agent, or Firm* — Hanley, Flight & Zimmerman, LLC

(57)                ABSTRACT

Methods, apparatus, systems, and articles of manufacture are disclosed for a hydrogen fuel distribution system with integrated thermal management. An example fuel distribution system with integrated thermal management comprises a hydrogen fuel distributor including a first tank and a second tank. The first tank and the second tank are fluidly coupled to a first fuel cell and a second fuel cell. A coolant distributor includes air-cooled coolers thermally coupled to the first fuel cell and the second fuel cells. A compressed air distributor is coupled to a propulsor, the first fuel cell, and the second fuel cell. An electrical distributor is electrically coupled to the first fuel cell, the second fuel cell, and an electric motor. The electric motor drives the propulsor.

20 Claims, 12 Drawing Sheets

(56)　　　　　　References Cited

U.S. PATENT DOCUMENTS

| | | | |
|---|---|---|---|
| 2022/0371741 A1 | 11/2022 | Tejpal | |
| 2022/0402621 A1* | 12/2022 | McLean ............... | B64D 27/355 |
| 2023/0340913 A1* | 10/2023 | Minas .................... | B64D 37/30 |
| 2023/0392551 A1* | 12/2023 | Minas ........................ | F02C 9/40 |
| 2024/0151358 A1* | 5/2024 | Minas ........................ | F17C 5/04 |
| 2024/0271833 A1* | 8/2024 | Minas ................ | H01M 8/0606 |

FOREIGN PATENT DOCUMENTS

| | | | | |
|---|---|---|---|---|
| EP | 4365086 A1 * | 5/2024 | ............ | B64D 37/30 |
| JP | 2011008986 | 1/2011 | | |
| JP | 2019153525 | 9/2019 | | |
| JP | 2020006812 | 1/2020 | | |
| JP | 6994103 | 1/2022 | | |

\* cited by examiner

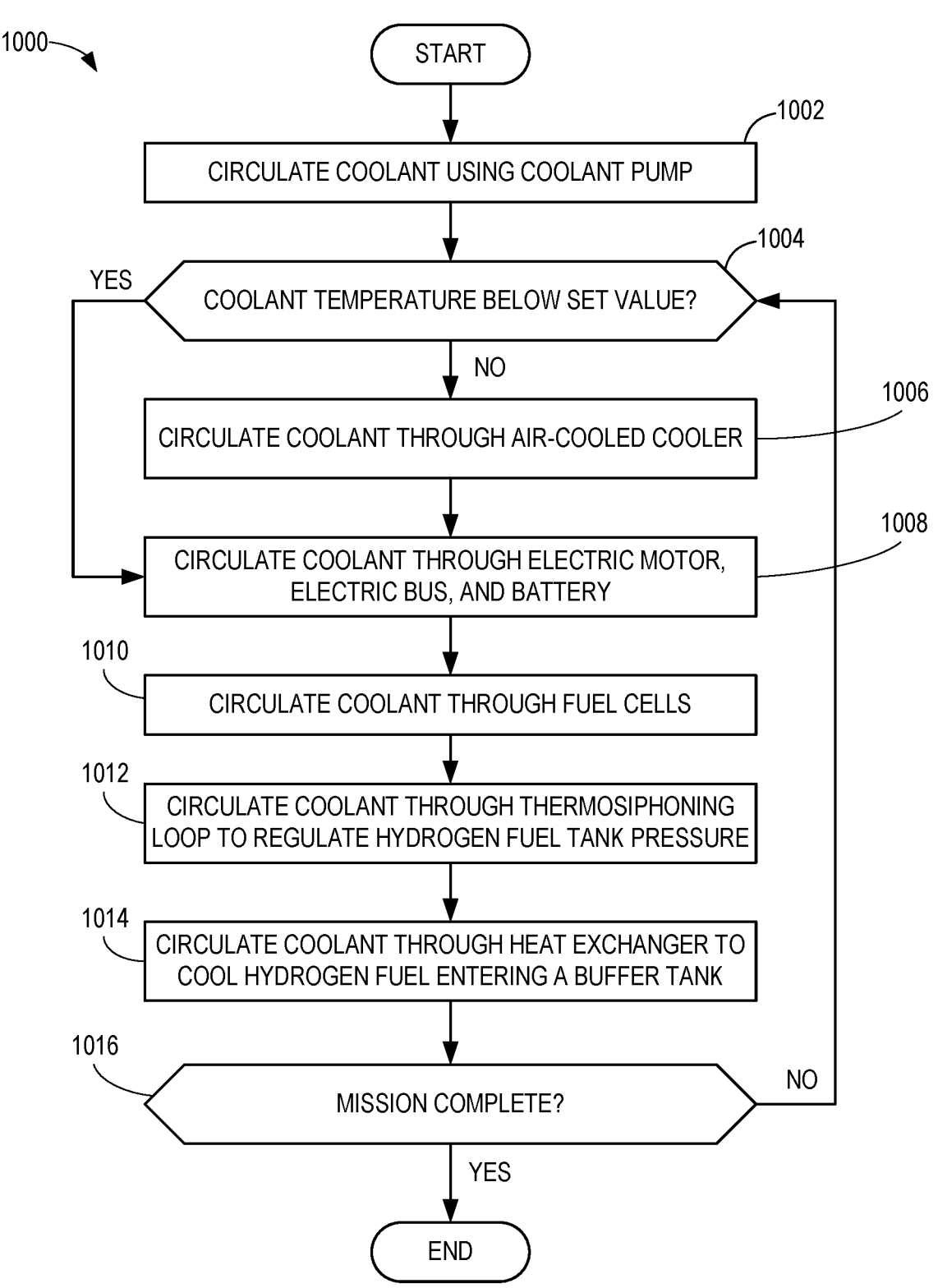

1000

START

1002
CIRCULATE COOLANT USING COOLANT PUMP

1004
COOLANT TEMPERATURE BELOW SET VALUE?

YES

NO

1006
CIRCULATE COOLANT THROUGH AIR-COOLED COOLER

1008
CIRCULATE COOLANT THROUGH ELECTRIC MOTOR, ELECTRIC BUS, AND BATTERY

1010
CIRCULATE COOLANT THROUGH FUEL CELLS

1012
CIRCULATE COOLANT THROUGH THERMOSIPHONING LOOP TO REGULATE HYDROGEN FUEL TANK PRESSURE

1014
CIRCULATE COOLANT THROUGH HEAT EXCHANGER TO COOL HYDROGEN FUEL ENTERING A BUFFER TANK

1016
MISSION COMPLETE?

NO

YES

END

FIG. 10

HYDROGEN FUEL DISTRIBUTION SYSTEM WITH INTEGRATED THERMAL MANAGEMENT

FIELD OF THE DISCLOSURE

This disclosure relates generally to hydrogen fuel distribution and, more particularly, to hydrogen fuel distribution systems with integrated thermal management.

BACKGROUND

In recent years, hydrogen-powered vehicles (e.g., cars, aircraft, buses etc.) have become increasingly common. As such, hydrogen fuel distribution systems have been developed. Hydrogen fuel distribution systems support fuel storage and fuel distribution to an engine or fuel cell. In some applications, such as in aircraft applications, multiple fuel tanks can be present as part of the fuel distribution system. The tanks can be connected to internal fuel pumps, associated valves, and to various thermal management systems to maintain the health of the hydrogen fuel distribution system. Furthermore, system elements of the hydrogen fuel distribution system may be duplicated to provide redundancy.

BRIEF DESCRIPTION OF THE DRAWINGS

FIG. 10 is a flow diagram of an example implementation of a coolant distributor described herein.

Figure 1:
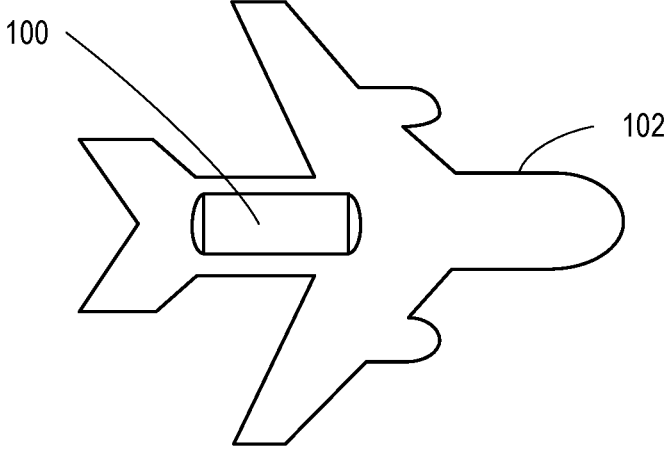
FIG. 1 illustrates an example positioning of a hydrogen fuel distribution system in an aircraft.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, "redundant" and "redundancy" refer to the intentional duplication of critical system components, where the duplicate system components may be connected to, but function independently of, the primary components. In some examples, system resources can be transferred between the primary components and the duplicate components in a way that bypasses failed components of either system. In additional examples, the primary and duplicate critical system components function as two separate primary systems of critical system components. In this case, the overall system may continue to function in the event of a failure of a number of elements of one of the primary systems or an entire primary system failure. "Redundant" and "redundancy" refer to the inclusion of duplicate critical system components with the goal of increasing reliability.

DETAILED DESCRIPTION

Hydrogen fuel distribution systems can be used to power vehicles (e.g., road vehicles, trains, aircraft etc.) and their associated powerplants. Hydrogen fuel distribution systems used in aircraft typically store fuel in cryogenic fuel tanks (e.g., fuel storage at extremely low temperatures to maintain a liquid hydrogen fuel state) which can be maintained at both high pressure (greater than 12 Bar) and low pressure (less than or equal to 12 Bar). The cryogenic fuel tanks may have a maximum allowable working pressure (MAWP) of between 12 and 15 Bar. In some examples the fuel can be stored at any pressure value or pressure range deemed appropriate (e.g., 10 Bar, 11 Bar, 8 Bar, 12-15 Bar. 10-12 Bar. etc.). In other examples, the liquid hydrogen fuel pressure can be regulated to extract gaseous hydrogen at pressures up to a pressure threshold (e.g., 8 Bar, 10 Bar, 11 Bar, 12 Bar, 15 Bar, etc.). If the desired hydrogen fuel pressure exceeds the threshold, a pump may be used. Additional elements of the hydrogen fuel distribution system, such as fuel cells, electric motors, and batteries require thermal regulation.

Efficient thermal management can be achieved through the integration of a thermal management system with the aircraft and hydrogen fuel distribution system hardware. Methods and apparatus disclosed herein incorporate a hydrogen fuel distribution system with a thermal management system. In some examples disclosed herein, a coolant distributor circulates coolant throughout a hydrogen fuel distributor, a compressed air distributor, and an electrical distributor. As described herein, the circulated coolant is cooled by an air-cooled cooler integrated with the body of the aircraft (e.g., an engine nacelle). While the coolant is circulated through the hydrogen fuel distribution system, the coolant both gains and loses thermal energy. For example, the circulated coolant ejects thermal energy to the ambient air and to a thermosiphoning heat exchanger and absorbs thermal energy from a fuel cell, an electric propulsor system, batteries, and electronics.

An example hydrogen fuel distribution system disclosed herein provides supporting elements as well as duplicates of certain system elements for the purposes of providing redundancies to increase the reliability of the overall system. For example, the hydrogen fuel distribution system includes duplicate hydrogen tanks and duplicate fuel cells. The duplicate hydrogen tanks and duplicate fuel cells are connected such that system resources (e.g., liquid hydrogen, electricity, coolant, compressed air, etc.) can be transferred between the duplicate hydrogen tanks and the duplicate fuel cells independently of each other. Various sensors (e.g., in control units, other controllers, etc.), fuel pumps, and valves regulate and direct the system resources throughout the hydrogen fuel distribution system. In addition, buffer tanks and thermosiphon apparatus regulate the pressure of the liquid hydrogen fuel within the hydrogen fuel storage tanks and throughout the system. As such, the example hydrogen fuel distribution system can be used to cool hydrogen and alleviate load on an air-cooled cooler, for example.

FIG. 1 is an example positioning of a hydrogen fuel distribution system 100 in an aircraft 102. In the example of FIG. 1, the hydrogen fuel distribution system 100 is positioned towards the rear (e.g., proximate the aircraft tail) of the aircraft 102. In other examples, the hydrogen fuel distribution system 100 can be positioned in other portions of the aircraft 102 appropriate for a desired operation of the hydrogen fuel distribution system 100. In some applications, hydrogen fuel produces power through combustion in a gas turbine engine, however, in the example of FIG. 1, the aircraft 102 is an electrified aircraft and is powered by a hydrogen fuel cell. Although the aircraft 102 shown in FIG. 1 is an airplane, the examples described herein may also be applied to other electrified fixed-wing aircraft and/or any type of electrified non-aircraft-based applications (e.g., road vehicles, trains, etc.). The example hydrogen fuel distribution system 100 can be used to provide hydrogen to a power generator (e.g., a hydrogen fuel cell stack) which can provide power to a propulsor system. The hydrogen fuel distribution system 100 may include one or more tanks and one or more pumps to supply liquid hydrogen to one or more fuel cell stacks. The hydrogen fuel distribution system 100 may also include hydrogen flow pathways which allow the hydrogen fuel to be distributed through each pump and to each fuel cell stack independently.

Figure 2:
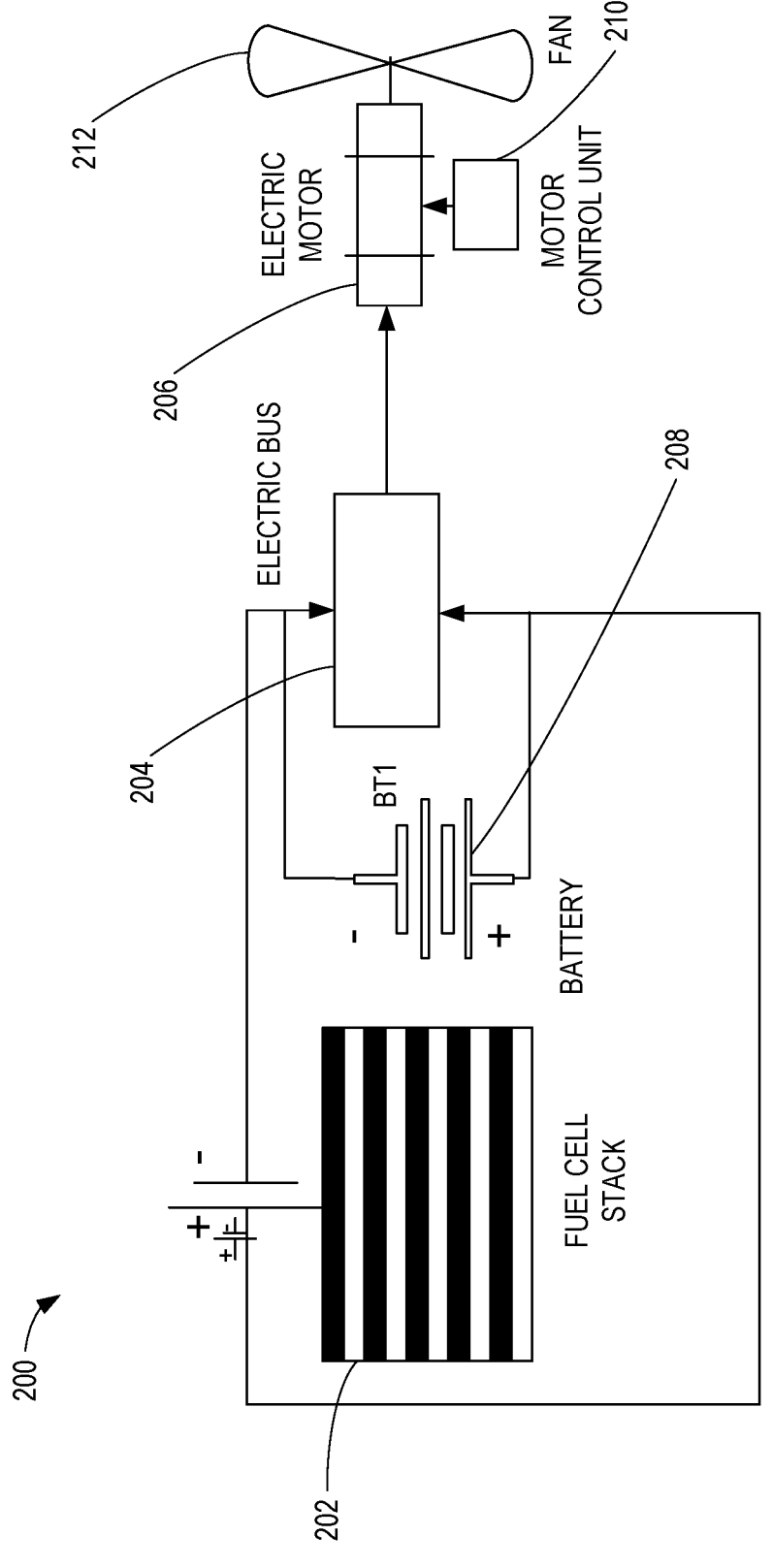
FIG. 2 illustrates an example hydrogen power system in which a hydrogen fuel cell stack is connected to a battery and an electric motor.

FIG. 2 illustrates an example hydrogen power system 200 including a hydrogen fuel cell stack 202, an electric bus 204, and an electric motor 206. In the example of FIG. 2, an example battery 208 is connected to the electric bus 204 where the electric bus 204 is additionally connected to the electric motor 206. An example motor control unit 210 is connected to the electric motor 206 to regulate an electrical input and a rotational output of the electric motor 206. In the example of FIG. 2, an example fan 212 is connected to, and is driven by, the electric motor 206. In other examples, the electric motor 206 can be connected to drive other mechanical elements (e.g., an axle, a rotor, a turbine, etc.).

In the example of FIG. 2, the fuel cell stack 202 receives hydrogen fuel and air, which undergo a proton-exchange process to produce electricity. Electrical output from the battery 208 is used to begin the proton-exchange process in the fuel cell stack 202. Once the fuel cell stack 202 is producing an electrical output, a portion of the electrical output of the fuel cell stack 202 is used to charge the battery 208. In the example of FIG. 2, the electric bus 204 directs a portion of the total electrical output of the fuel cell stack 202 between the battery 208 and the electric motor 206. In some examples, once the battery 208 has reached a desired level of charge (e.g., 80% of the electrical capacity of the battery is reached), the hydrogen fuel flow to the fuel cell stack 202 is reduced such that the electrical output of the fuel cell stack 202 is reduced.

In the illustrated example of FIG. 2, the example hydrogen power system 200 does not include redundant elements. For example, the fuel cell stack 202, the electric bus 204, the electric motor 206, the battery 208, the motor control unit 210, and the fan 212 are unique elements in the hydrogen power system 200 and are not supported by secondary systems. Such lack of support or backup can be damaging to system reliability.

Figure 3:
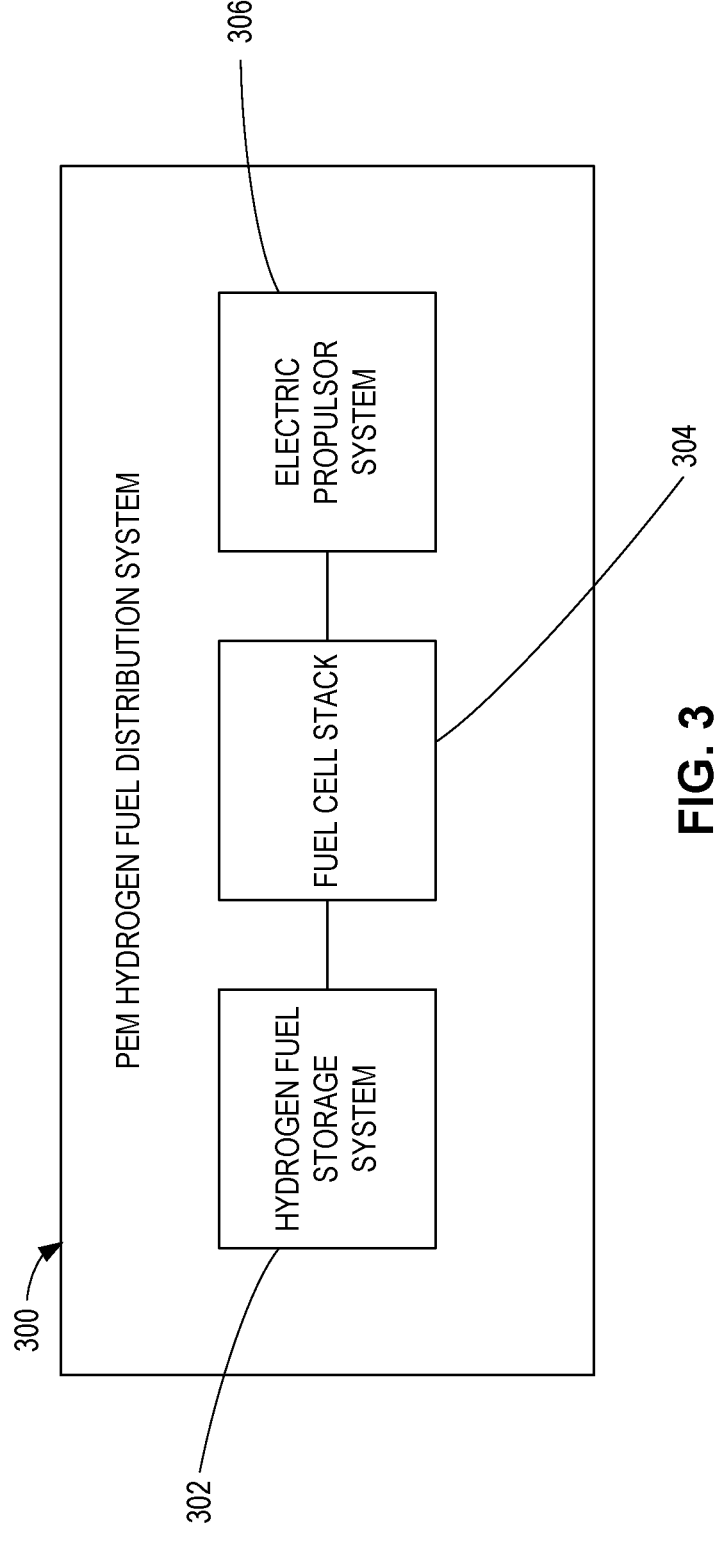
FIG. 3 illustrates an example of the major system elements of a Proton Exchange Membrane (PEM) hydrogen fuel distribution system.

FIG. 3 illustrates an example Proton Exchange Membrane (PEM) hydrogen fuel distribution system 300 including a hydrogen fuel storage system 302, a fuel cell stack 304, and an electric propulsor system 306. The hydrogen fuel storage system 302 can be implemented using hydrogen fuel storage tanks, a thermosiphon and heat exchanger apparatus, and a series of flow regulators and valves, for example. The fuel cell stack 304 can be implemented using PEM hydrogen fuel cells and electrical wiring to provide power from the PEM hydrogen fuel cells to the electric propulsor system 306, for example. The electric propulsor system 306 can be implemented using a battery, an electric bus, an electric motor, a motor control unit, and a propulsor, for example. The PEM hydrogen fuel distribution system 300 of FIG. 3 circulates hydrogen fuel, coolant, compressed air, and electricity throughout the hydrogen fuel storage system 302, the fuel cell stack 304, and the electric propulsor system 306.

The hydrogen fuel storage system 302 stores and manages the hydrogen fuel as it flows through the PEM hydrogen fuel distribution system 300 and through the fuel cell stack 304. The hydrogen fuel in the hydrogen fuel storage system 302 is stored in cryogenic tanks. If the hydrogen fuel is stored at pressures below a pressure threshold (e.g., 8 Bar, 10 Bar, 11 Bar, 12 Bar, 15 Bar, etc.), for example, a pump is used to pump the hydrogen fuel out of the storage tanks and through the fuel cell stack. To maintain a desired pressure in the hydrogen fuel storage system 302, the thermosiphon and heat exchanger apparatus are used for thermal regulation. In other examples, the hydrogen fuel storage system 302 includes a hydrogen fuel distributor.

The fuel cell stack 304 receives hydrogen fuel from the hydrogen fuel storage system 302 and compressed air from the electric propulsor system 306, and outputs electricity to the electric propulsor system 306. As coolant circulates through the fuel cell stack 304, the hydrogen fuel cells in the fuel cell stack 304 reject thermal energy to the coolant. In other examples, the fuel cell stack 304 includes an electrical distributor. In some examples, the fuel cell stack 304 provides electrical output to a battery, a propulsor, or both a battery and a propulsor.

The electric propulsor system 306 receives electricity from the fuel cell stack 304 to power the electric motor to drive the propulsor of the electric propulsor system 306. Integrated into the propulsor is an air-cooled cooler which allows circulated coolant to reject thermal energy to the ambient air. In the example of FIG. 3, the electric propulsor system 306 includes a battery to provide electricity to start the electricity generation process of the fuel cells of the fuel cell stack 304. In some examples, once the fuel cell stack 304 is operating, electricity is diverted to the battery until the battery reaches a desired charge level. Compressed air can be drawn from the electric propulsor system 306 and provided to the fuel cell stack 304. In other examples, the electric propulsor system 306 includes a coolant distributor and a compressed air distributor.

Figure 4:
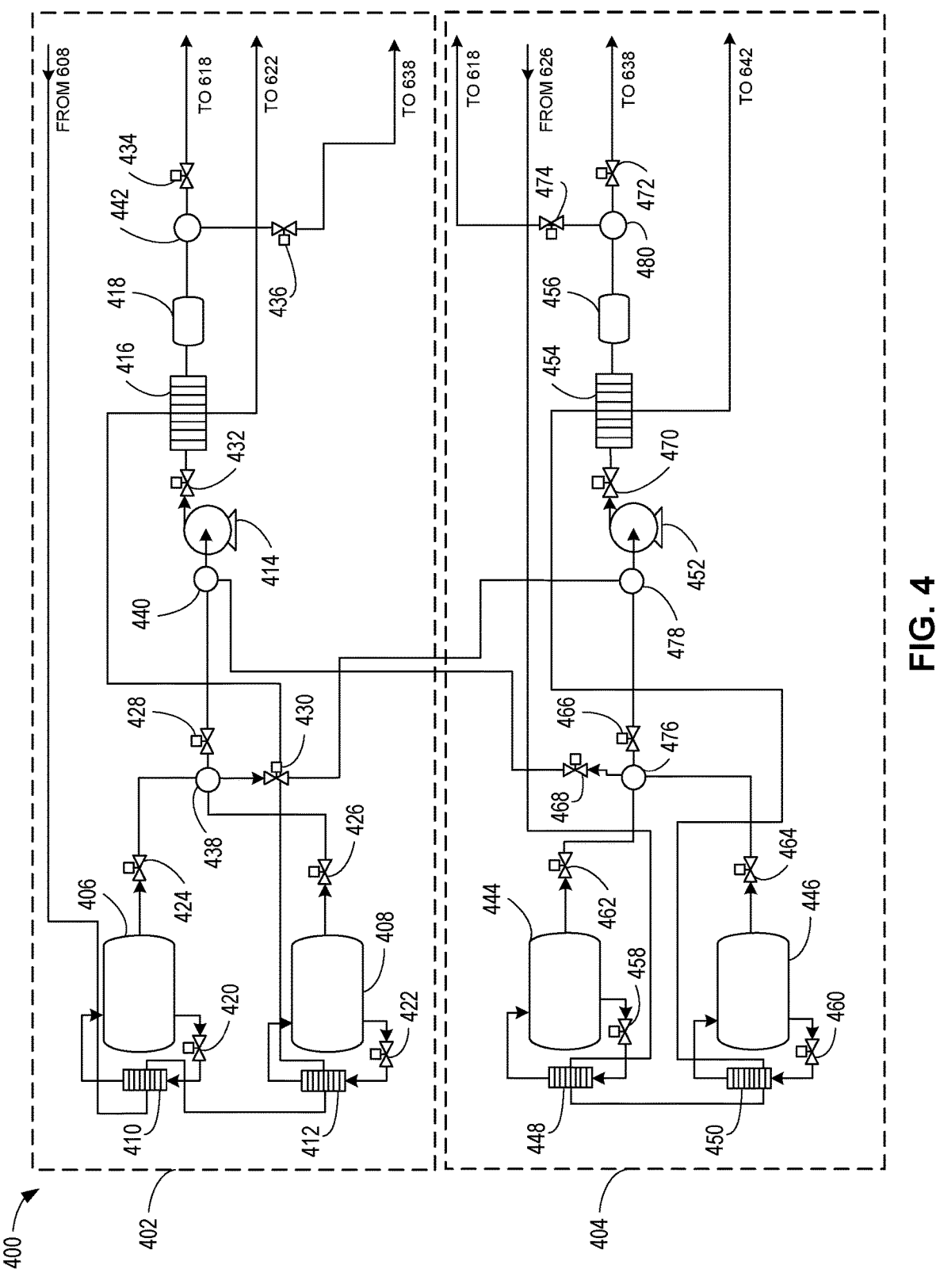
FIG. 4 illustrates an example schematic of a first portion of a hydrogen fuel distribution system including a first hydrogen pump and a second hydrogen pump.

FIG. 4 illustrates an example system diagram of an example hydrogen fuel storage system 400. The hydrogen fuel storage system 400 is an example first implementation of the hydrogen fuel storage system 302. In the illustrated example of FIG. 4, the hydrogen fuel storage system 400 includes a first hydrogen fuel distributor 402 and a second hydrogen fuel distributor 404. In the illustrated example of FIG. 4, the first hydrogen fuel distributor 402 and the second hydrogen fuel distributor 404 are substantially the same, including duplicate components and functions. The first hydrogen fuel distributor 402 and the second hydrogen fuel distributor 404 are redundant systems to each other. In some examples, the first hydrogen fuel distributor 402 and the second hydrogen fuel distributor 404 support energy generation for separate systems (e.g., a first propulsor and a second propulsor) while in other examples, the first hydrogen fuel distributor 402 and the second hydrogen fuel distributor 404 can support energy generation for one or multiple systems together or individually.

In the illustrated example of FIG. 4 the first hydrogen fuel distributor 402 includes a first tank 406 and a second tank 408 connected with a first thermosiphon loop 410 and a second thermosiphon loop 412 respectively. The first hydrogen fuel distributor 402 includes a pump 414, a first heat exchanger 416, and a buffer tank 418. The first hydrogen fuel distributor 402 additionally includes a first thermosiphon valve 420, a second thermosiphon valve 422, a first control valve 424, a second control valve 426, a third control valve 428, a fourth control valve 430, a fifth control valve 432, a sixth control valve 434, a seventh control valve 436, a first junction 438 a second junction 440, and a third junction 442.

Similar to the example of the first hydrogen fuel distributor 402, the second hydrogen fuel distributor 404 includes a third tank 444, a fourth tank 446, a third thermosiphon loop 448, and a fourth thermosiphon loop 450. The second hydrogen fuel distributor 404 additionally includes a pump 452, a second heat exchanger 454, a buffer tank 456, a third thermosiphon valve 458, a fourth thermosiphon valve 460, example control valves 462, 464, 466, 468, 470, 472, 474, and example junctions 476, 478, 480.

In the example of FIG. 4, the tanks 406, 408, 444, 446 store hydrogen fuel at cryogenic temperatures and at pressures greater than a pressure threshold (e.g., 8 Bar, 10 Bar, 11 Bar, 12 Bar, 15 Bar, etc.). In other examples, (e.g., the hydrogen fuel storage system 500 of FIG. 5) the tanks 406, 408, 444, 446 store hydrogen fuel at pressures less than or equal to 12 Bar. In the example of FIG. 4, the tanks 406, 408, 444, 446 are redundant to each other, and hydrogen fuel can flow between the hydrogen fuel distributors 402, 404 independently. Additionally, the tanks 406, 408, 444, 446 can increase or decrease the flow of hydrogen fuel through the hydrogen fuel distributors 402, 404 to adjust to different energy demands. For example, during times of high demand (e.g., aircraft takeoff) the tanks 406, 408, 444, 446 can increase the flow of hydrogen fuel. Conversely, during times of low demand (e.g., aircraft ground idle, aircraft taxi) the tanks 406, 408, 444, 446 can decrease the flow of hydrogen fuel. From the tanks 406, 408, 444, 446, hydrogen fuel is circulated through the thermosiphon loops 410, 412, 448, 450. In other examples, the thermosiphon loops 410, 412, 448, 450 receive coolant from a coolant distributor (e.g., the coolant distributors 702, 704 of FIG. 7) and regulate the temperature and pressure of the hydrogen fuel within the tanks 406, 408, 444, 446 respectively. The thermosiphon loops 410, 412, 448, 450 include the thermosiphon valves 420, 422, 458, 460, which can regulate the flow of hydrogen fuel through the thermosiphon loops 410, 412, 448, 450.

In the illustrated example of FIG. 4, the pumps 414, 452 pump hydrogen fuel out of the tanks 406, 408, 444, 446 and though the hydrogen fuel distributors 402, 404 along various fuel flow pathways. In the example of FIG. 4, the junctions 438, 440, 442, 476, 478, 480 can be implemented as valves to split, direct, and/or merge hydrogen fuel flows along different flow pathways. In other examples, when the tanks 406, 408, 444, 446 store the hydrogen fuel at higher pressures, the pumps 414, 452 may not be included in the hydrogen fuel distributors 402, 404. In FIG. 4, once the hydrogen fuel is pumped from the tanks 406, 408, 444, 446, the fuel flows through the valves 424, 426, 462, 464, respectively. The valves 424, 426 regulate the fuel flow from the tanks 406, 408 to the junction 438 and the valves 462, 464 regulate the fuel flow from the tanks 444, 446 to the junction 476.

In the hydrogen fuel distributor 402, the fuel flow from the tank 406 and the tank 408 converge at the junction 438. At the junction 438, the hydrogen fuel flow can be split and/or diverted to flow to the second hydrogen fuel distributor 404. In the illustrated example of FIG. 4, the valve 428 regulates the portion of the hydrogen fuel flow from the tanks 406, 408 which continues to junction 440. The valve 430 regulates the portion of the hydrogen fuel from the tanks 406, 408 of the first hydrogen fuel distributor 402 which flows from the junction 438 to the junction 478 of the second hydrogen fuel distributor 404. In alternative examples, all of the merged hydrogen fuel flow from the junction 438 can be diverted to flow through the valve 430 and to the junction 478 of the second hydrogen fuel distributor 404. Conversely, in other examples, the entirety of the merged hydrogen fuel flow from the junction 438 flows through the valve 428 and continues to junction 440.

Similarly, in the hydrogen fuel distributor 404, the fuel flow from the tank 444 and from the tank 446 converge at the junction 476. At the junction 476, the hydrogen fuel flow can be split and/or diverted to flow to the first hydrogen fuel distributor 402. In the illustrated example of FIG. 4, the valve 466 regulates the portion of the hydrogen fuel flow from the tanks 444, 446 which continues to the junction 478. The valve 468 regulates the portion of the hydrogen fuel from the tanks 444, 446 of the second hydrogen fuel distributor 404 which flows from the junction 476 to the junction 440 of the first hydrogen fuel distributor 402. In alternative examples, all of the merged hydrogen fuel flow from the junction 476 can be diverted to flow through the valve 468 and to the junction 440 of the first hydrogen fuel distributor 402. Conversely, in other examples, the entirety of the merged hydrogen fuel flow from the junction 476 flows through the valve 466 and continues to junction 478.

In the example of FIG. 4, the junction 440 of the first hydrogen fuel distributor 402 serves to merge hydrogen fuel flow diverted from the second hydrogen fuel distributor 404 and the hydrogen fuel flow which continues from the control valve 428. Additionally, the junction 478 of the second hydrogen fuel distributor 404 serves to merge hydrogen fuel flow diverted from the first hydrogen fuel distributor 402 and the hydrogen fuel flow which continues from the control valve 466. The merged hydrogen fuel flow from junctions 440, 478 is pumped through the pumps 414, 452, through the valves 432, 470, and into the heat exchangers 416, 454 respectively. In the illustrated example of FIG. 4, the heat exchangers 416, 454 additionally receive circulated coolant from the thermosiphon loops 410, 412 and from the thermosiphon loops 448, 450, respectively. The coolant passing through the heat exchangers 416, 454 absorbs thermal energy from the hydrogen fuel and continues to an example first coolant pump 622 and an example second coolant pump 642 of an example fuel cell stack 600 of FIG. 6.

In the illustrated example of FIG. 4, the hydrogen fuel continues through the heat exchangers 416, 454 and into the buffer tanks 418, 456. In some examples, the buffer tanks 418, 456 regulate (e.g., vary a mass flow rate between a tank inlet and outlet, purge excess pressure, etc.) the hydrogen fuel flow from the heat exchangers 416, 454. In additional examples, the buffer tanks 418, 456 can measure hydrogen fuel characteristics (e.g., a temperature, a pressure, a mass, etc.). The hydrogen fuel flow exiting the buffer tanks 418, 456 continues to the junctions 442, 480.

In the first hydrogen fuel distributor 402 of FIG. 4, the hydrogen fuel flow can be split and/or diverted at the junction 442 to flow to the second hydrogen fuel distributor 404. In the illustrated example of FIG. 4, the valve 434 regulates the portion of the hydrogen fuel flow from the buffer tank 418, which continues through the junction 442 to an example junction 618 of the fuel cell stack 600 of FIG. 6. The valve 436 regulates the portion of the hydrogen fuel from the buffer tank 418 of the first hydrogen fuel distributor 402, which flows from the junction 442 to an example junction 638 of the fuel cell stack of FIG. 6. In alternative examples, all of the merged hydrogen fuel flow from the junction 442 can be diverted to flow through the valve 436 and to the junction 638 of the fuel cell stack 600. Conversely, in other examples, the entirety of the merged hydrogen fuel flow from the junction 442 flows through the valve 434 and continues to the junction 618 of FIG. 6.

Similarly, in the second hydrogen fuel distributor 404 of FIG. 4, at the junction 480, the hydrogen fuel flow can be split and/or diverted to flow to the first hydrogen fuel distributor 402. In the illustrated example of FIG. 4, the valve 472 regulates the portion of the hydrogen fuel flow from the buffer tank 456 which continues through the junction 480 to an example junction 638 of the fuel cell stack 600. The valve 474 regulates the portion of the hydrogen fuel from the buffer tank 456 of the second hydrogen fuel distributor 404 which flows from the junction 480 to an example junction 618 of the fuel cell stack of FIG. 6. In alternative examples, all of the merged hydrogen fuel flow from the junction 480 can be diverted to flow through the valve 474 and to the junction 618 of the fuel cell stack 600. Conversely, in other examples, the entirety of the merged hydrogen fuel flow from the junction 480 flows through the valve 472 and continues to the junction 638 of FIG. 6.

Figure 5:
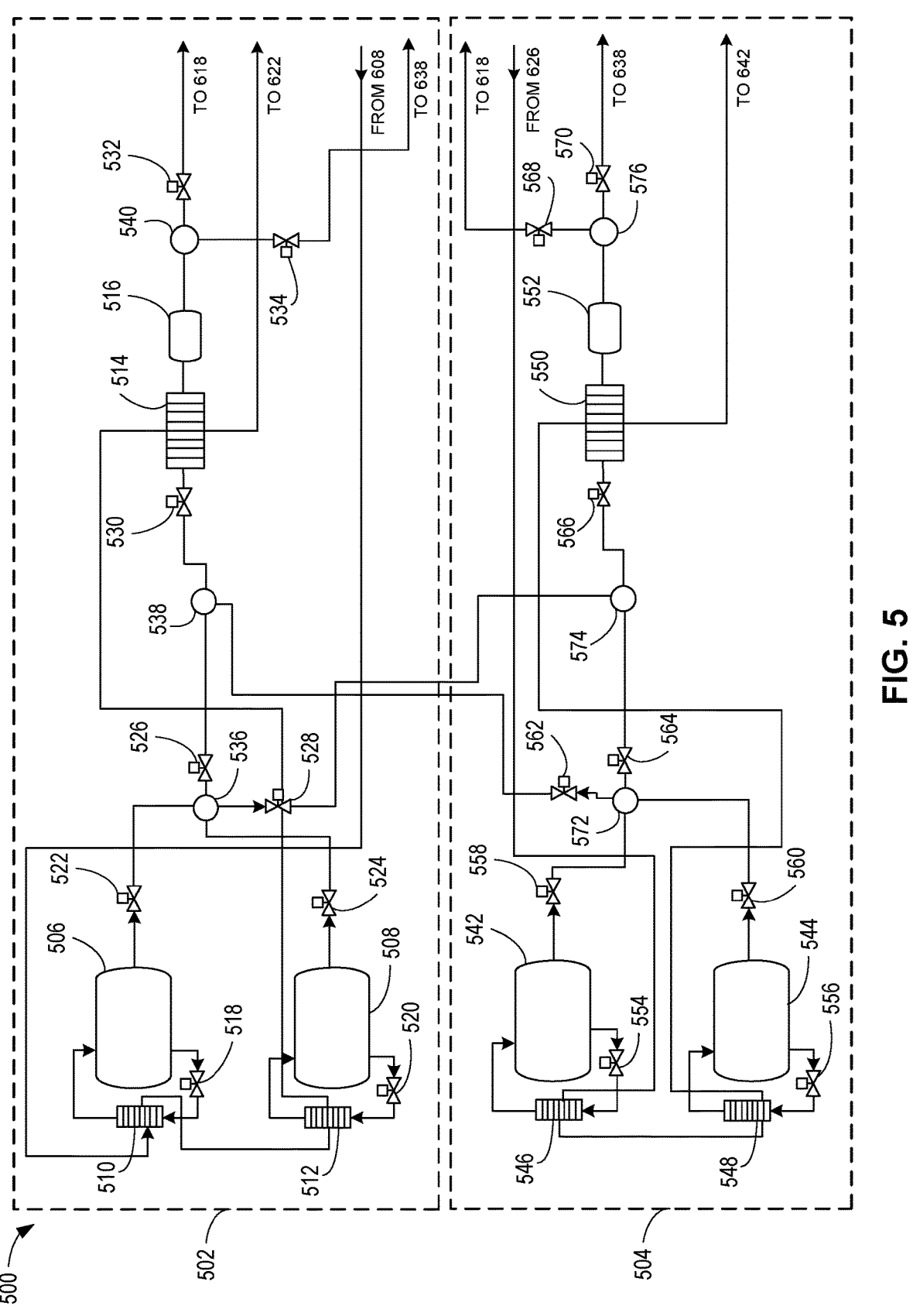
FIG. 5 illustrates an example schematic of a second portion of a hydrogen fuel distribution system without hydrogen pumps.

FIG. 5 illustrates an example system diagram of a hydrogen fuel storage system 500. The hydrogen fuel storage system 500 is an example second implementation of the hydrogen fuel storage system 302. While the hydrogen fuel storage system 400 in the example of FIG. 4 includes the pumps 414, 452 and stores hydrogen fuel at pressures greater than a pressure threshold (e.g., 8 Bar, 10 Bar, 11 Bar, 12 Bar, 15 Bar, etc.), the hydrogen fuel storage system 500 lacks pumps and stores the hydrogen fuel at pressures less than or equal to the pressure threshold.

In the illustrated example of FIG. 5, the hydrogen fuel storage system 500 includes a first hydrogen fuel distributor 502 and a second hydrogen fuel distributor 504. In the illustrated example of FIG. 5, the first hydrogen fuel distributor 502 and the second hydrogen fuel distributor 504 are substantially the same, including duplicate components and functions. Similar to the first hydrogen fuel distributor 402 of FIG. 4, the example first hydrogen fuel distributor 502 includes a first tank 506 and a second tank 508 connected to a first thermosiphon loop 510 and a second thermosiphon loop 512, respectively. The example first hydrogen fuel distributor 502 includes a first heat exchanger 514 and a buffer tank 516. The example first hydrogen fuel distributor 502 additionally includes thermosiphon valves 518, 520, control valves 522, 524, 526, 528, 530, 532, 534, and junctions 536, 538, 540.

The second hydrogen fuel distributor 504 includes a third tank 542, a fourth tank 544, a third thermosiphon loop 546, and a fourth thermosiphon loop 548. The second hydrogen fuel distributor 504 additionally includes a second heat exchanger 550, a buffer tank 552, a third thermosiphon valve 554, a fourth thermosiphon valve 556, control valves 558, 560, 562, 564, 566, 568, 570, and junctions 572, 574, 576.

In the example of FIG. 5, the tanks 506, 508, 542, 544 store hydrogen fuel at cryogenic temperatures and at pressures less than or equal to a pressure threshold (e.g., 8 Bar, 10 Bar, 11 Bar, 12 Bar, 15 Bar, etc.). In some examples, the tanks 506, 508, 542, 544 are filled to 90% capacity such that the tanks 506, 508, 542, 544 contain a mix of liquid hydrogen and saturated hydrogen vapor. In the example of FIG. 5, the tanks 506, 508, 542, 544 are redundant to each other, and hydrogen fuel can flow between the hydrogen fuel distributors 502, 504 independently. From the tanks 506, 508, 542, 544 hydrogen fuel is circulated through the thermosiphon loops 510, 512, 546, 548. In the example of FIG. 5, the thermosiphon loops 510, 512, 546, 548 receive coolant from a coolant distributor and regulate the temperature and pressure of the hydrogen fuel within the tanks 506, 508, 542, 544 respectively. The thermosiphon loops 510, 512, 546, 548 include the thermosiphon valves 518, 520, 554, 556 which can regulate the flow of hydrogen fuel through the thermosiphon loops 510, 512, 546, 548.

Unlike the illustrated example of FIG. 4, the hydrogen fuel storage system 500 lacks the pumps 414, 452. In the example of FIG. 5, the stored pressure of the hydrogen fuel is sufficient to circulate the hydrogen fuel throughout the hydrogen fuel storage system 500. In the example of FIG. 5, the junctions 536, 538, 540, 572, 574, 576 can be implemented as valves to split, direct, and/or merge hydrogen fuel flows along different flow pathways. Once the hydrogen fuel flows from the tanks 506, 508, 542, 544 it flows through the valves 522, 524, 558, 560 respectively. The valves 522, 524 regulate the fuel flow from the tanks 506, 508 to the junction 536 and the valves 558, 560 regulate the fuel flow from the tanks 542, 544 to the junction 572.

In the hydrogen fuel distributor 502, the fuel flow from the tank 506 and the tank 508 converge at the junction 536 at which the hydrogen fuel flow can be split and/or diverted to flow to the second hydrogen fuel distributor 404. In the illustrated example of FIG. 5, the valve 526 regulates the portion of the hydrogen fuel flow from the tanks 506, 508 which continues to junction 538. The valve 528 regulates the portion of the hydrogen fuel from the tanks 506, 508 of the first hydrogen fuel distributor 502 which flows from the junction 536 to the junction 574 of the second hydrogen fuel distributor 504. In alternative examples, all of the merged hydrogen fuel flow from the junction 536 can be diverted to flow through the valve 528 and to the junction 574 of the second hydrogen fuel distributor 504. Conversely, in other examples, the entirety of the merged hydrogen fuel flow from the junction 536 flows through the valve 526 and continues to junction 538.

Similarly, in the hydrogen fuel distributor 504, the fuel flow from the tank 542 and the fuel flow from the tank 544 converge at the junction 572. At the junction 572, the hydrogen fuel flow can be split and/or diverted to flow to the first hydrogen fuel distributor 502. In the illustrated example of FIG. 5, the valve 564 regulates the portion of the hydrogen fuel flow from the tanks 542, 544 which continues to junction 574. The valve 562 regulates the portion of the hydrogen fuel from the tanks 542, 544 of the second hydrogen fuel distributor 504 which flows from the junction 572 to the junction 538 of the first hydrogen fuel distributor 502. In alternative examples, all of the merged hydrogen fuel flow from the junction 572 can be diverted to flow through the valve 562 and to the junction 538 of the first hydrogen fuel distributor 502. Conversely, in other examples, the entirety of the merged hydrogen fuel flow from the junction 572 flows through the valve 564 and continues to junction 574.

In the example of FIG. 5, the junction 538 of the first hydrogen fuel distributor 502 serves to merge hydrogen fuel flow diverted from the second hydrogen fuel distributor 504 and the hydrogen fuel flow which continues from the control valve 526. Additionally, the junction 574 of the second hydrogen fuel distributor 504 serves to merge hydrogen fuel flow diverted from the first hydrogen fuel distributor 502 and the hydrogen fuel flow which continues from the control valve 564. The merged hydrogen fuel flow from junctions 538, 574 flows through the valves 530, 566, and into the heat exchangers 514, 550 respectively. The heat exchangers 514, 550 additionally receive circulated coolant from the thermosiphon loops 510, 512 and from the thermosiphon loops 546, 548 respectively. The heat exchangers 514, 550 transfer thermal energy from the hydrogen fuel to the circulated coolant. The coolant continues to the first coolant pump 622 and the second coolant pump 642 of the fuel cell stack 600 of FIG. 6.

In the illustrated example of FIG. 5, the hydrogen fuel continues through the heat exchangers 514, 550 and into the buffer tanks 516, 552 which can regulate (e.g., vary a mass flow rate between a tank inlet and outlet, purge excess pressure, etc.) the hydrogen fuel flow from the heat exchangers 514, 550. In additional examples, the buffer tanks 516, 552 can measure hydrogen fuel characteristics (e.g., a temperature, a pressure, a mass, etc.). The hydrogen fuel flow exiting the buffer tanks 516, 552 continues to the junctions 540, 576.

In the first hydrogen fuel distributor 502 of FIG. 5, at the junction 540 the hydrogen fuel flow can be split and/or diverted to flow to the second hydrogen fuel distributor 504. The valve 532 regulates the portion of the hydrogen fuel flow from the buffer tank 516 which continues through the junction 540 to an example junction 618 of the fuel cell stack 600 of FIG. 6. The valve 534 regulates the portion of the hydrogen fuel from the buffer tank 516 of the first hydrogen fuel distributor 502 which flows from the junction 540 to an example junction 638 of the fuel cell stack of FIG. 6. In alternative examples, all of the merged hydrogen fuel flow from the junction 540 can be diverted to flow through the valve 532 and to the junction 618 of the fuel cell stack 600. Conversely, in other examples, the entirety of the merged hydrogen fuel flow from the junction 540 flows through the valve 534 and continues to the junction 638 of FIG. 6.

Similarly, in the second hydrogen fuel distributor 504 of FIG. 5, at the junction 576, the hydrogen fuel flow can be split and/or diverted to flow to the first hydrogen fuel distributor 502. In the illustrated example of FIG. 5, the valve 570 regulates the portion of the hydrogen fuel flow from the buffer tank 552 which continues through the junction 576 to an example junction 638 of the fuel cell stack 600. The valve 568 regulates the portion of the hydrogen fuel from the buffer tank 552 of the second hydrogen fuel distributor 504 which flows from the junction 576 to an example junction 618 of the fuel cell stack of FIG. 6. In alternative examples, all of the merged hydrogen fuel flow from the junction 576 can be diverted to flow through the valve 570 and to the junction 638 of the fuel cell stack 600. Conversely, in other examples, the entirety of the merged hydrogen fuel flow from the junction 576 flows through the valve 568 and continues to the junction 618 of FIG. 6.

Figure 6:
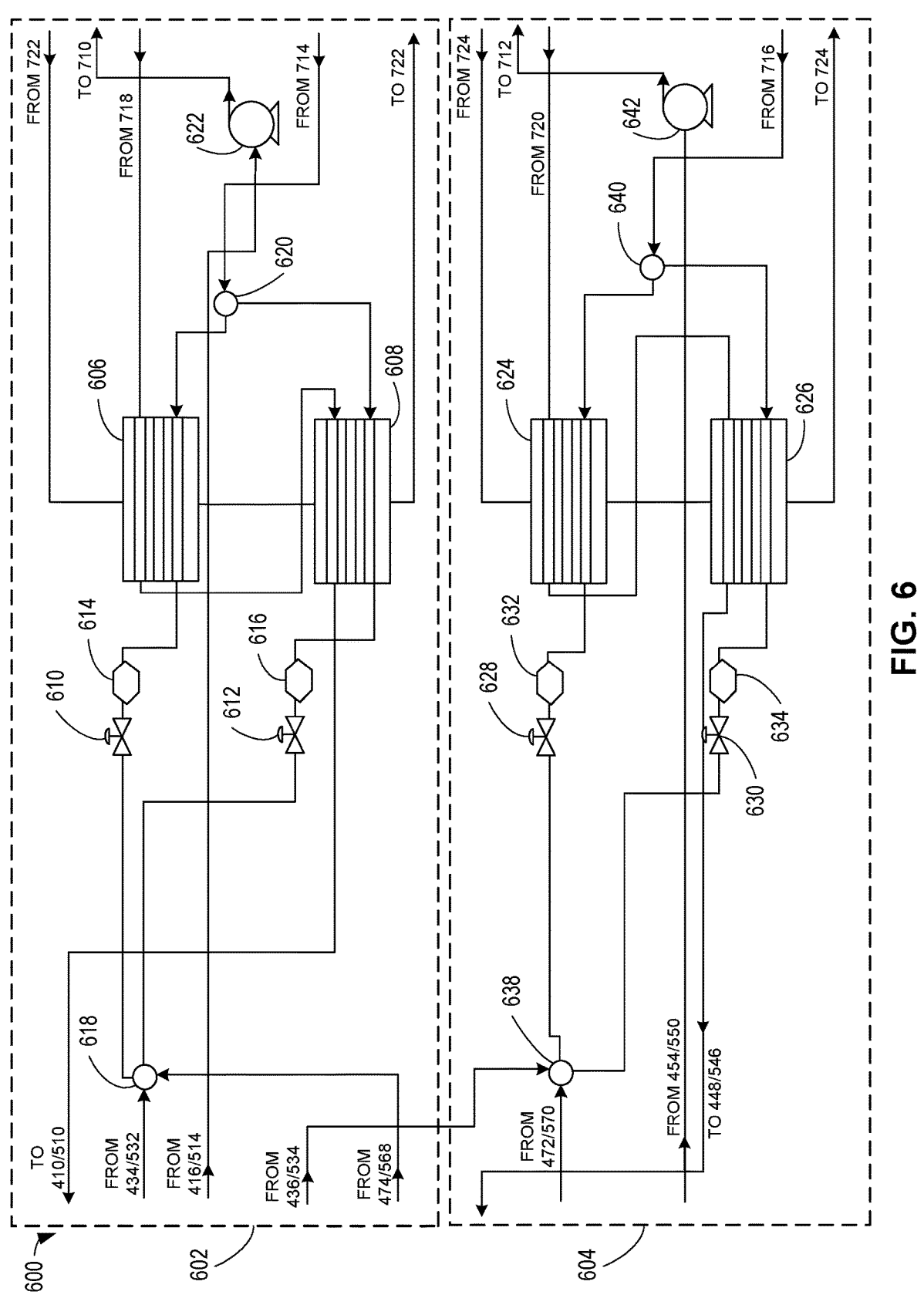
FIG. 6 illustrates an example system diagram of a fuel cell stack of a hydrogen fuel distribution system.

FIG. 6 illustrates an example system diagram of a fuel cell stack 600 of a hydrogen fuel distribution system (e.g., the hydrogen fuel distribution system 100 of FIG. 1). In the illustrated example of FIG. 6, the fuel cell stack 600 includes a first electrical distributor 602 and a second electrical distributor 604. The first electrical distributor 602 and the second electrical distributor 604 are substantially the same, including duplicate components and functions. The first electrical distributor 602 exchanges hydrogen fuel and coolant with the first hydrogen fuel distributors 402, 502 of FIGS. 4 and 5 while the second electrical distributor 604 exchanges hydrogen fuel and coolant with the second hydrogen fuel distributors 404, 504 of FIGS. 4 and 5.

In the example of FIG. 6, the first electrical distributor 602 includes a first fuel cell 606, a second fuel cell 608, a valve 610, a valve 612, a flowmeter 614, a flowmeter 616, a junction 618, a junction 620, and the first coolant pump 622. Similarly, the second electrical distributor 604 includes fuel cells 624, 626, valves 628, 630, flowmeters 632, 634, junctions 638, 640, and the coolant pump 642.

Figure 7:
FIG. 7 illustrates an example system diagram of an electric propulsor system forming part of a hydrogen fuel distribution system.

FIG. 7 illustrates an example system diagram of an electric propulsor system 700 of a hydrogen fuel distribution system (e.g., the hydrogen fuel distribution system 100 of FIG. 1). In the illustrated example of FIG. 7, the electric propulsor system 700 includes a first coolant distributor 702, a second coolant distributor 704, a first compressed air distributor 706, and a second compressed air distributor 708. The first coolant distributor 702 and the second coolant distributor 704 include a first air-cooled cooler 710 and a second air-cooled cooler 712 respectively. The first compressed air distributor 706 and the second compressed air distributor 708 include a first air compressor 714 and a second air compressor 716 respectively.

In the example of FIG. 7, the electric propulsor system 700 additionally includes a first battery 718, a second battery 720, a first electric bus 722, a second electric bus 724, a first electric motor 726, a second electric motor 728, a first propulsor 730, and a second propulsor 732. The electric motors 726, 728 include a first motor control unit 734 and a second motor control unit 736, respectively.

In the examples of FIGS. 6 and 7, coolant circulates through the first electrical distributor 602 and the second electrical distributor 604 from the hydrogen fuel distributors 402, 404, 502, 504 of FIGS. 4 and 5 to the electric propulsor system 700 of FIG. 7 and from the electric propulsor system 700 of FIG. 7 to the hydrogen fuel distributors 402, 404, 502, 504 of FIGS. 4 and 5. For example, coolant is pumped through the first coolant pump 622 from the heat exchangers 416, 514 and through the second coolant pump 642 from the heat exchangers 454, 550 to the air-cooled cooler 710 and the air-cooled cooler 712. The coolant additionally flows from the coolant distributors 702, 704 through the electric motors 726, 728, the electric bus 722, 724, the batteries 718, 720, the fuel cells 606, 608 and the fuel cells 624, 626 to the thermosiphon loops 410, 448, 510, 546. The coolant gains thermal energy from the fuel cells 606, 608, and the fuel cells 624, 626. In the example of FIG. 7, the coolant passing through the air-cooled coolers 710, 712 loses thermal energy to the ambient air. In other examples, the air-cooled coolers 710, 712 or other heat-ejecting apparatus may be integrated into a nacelle of a propulsor of the electric propulsor system 700.

In the example of FIG. 6, hydrogen flows through the first electrical distributor 602 from the valves 434, 532 and the valves 474, 568 to the junction 618 where the flows merge. At the junction 618, the fuel flow can be split and directed to flow towards the fuel cell 606 and/or the fuel cell 608. The portion of the fuel flow that is directed towards the fuel cell 606 first passes through the valve 610 and the flowmeter 614. Similarly, the portion of the fuel flow which is directed towards the fuel cell 608 first passes through the valve 612 and the flowmeter 616. In the example of FIG. 6, flowmeters 614, 616 can measure characteristics (e.g., pressure, temperature, flow rate, etc.) of the hydrogen flow. In some examples, the valves 610, 612 can regulate (e.g., restrict, stop, etc.) the flow of fuel to the flowmeters 614, 616 in response to the flow characteristics measured by the flowmeters 614, 616. In other examples, all of the flow through junction 618 can be directed through the valve 610 and the flowmeter 614 to the fuel cell 606 or directed through the valve 612 and the flowmeter 616 to the fuel cell 608.

Similar to the first electrical distributor 602, hydrogen flow through the second electrical distributor 604 is received from the valves 436, 472, 534, 570 and is merged at the junction 638. At the junction 638, a portion of the fuel flow can be directed through the valve 628 and the flowmeter 632 to the fuel cell 624, while a different portion of the fuel flow can be directed through the valve 630 and the flowmeter 634 to the fuel cell 626. In the example of FIG. 6, the valves 628, 630 can regulate (e.g., restrict, stop, etc.) the flow of fuel to the flowmeters 632, 634 in response to flow characteristics (e.g., pressure, temperature, flow rate, etc.) measured by the flowmeters 632, 634. In other examples, all of the flow through junction 638 can be directed through the valve 628 and the flowmeter 632 to the fuel cell 624 or directed through the valve 630 and the flowmeter 634 to the fuel cell 626. In other examples, an excess of hydrogen fuel flows to the fuel cells 606, 608, 624, 626 to increase the efficiency of the fuel cells 606, 608, 624, 626. In this example, excess hydrogen fuel can be recirculated back into the hydrogen fuel distributors 402, 404, 502, 504.

In the example of FIG. 6, the fuel cells 606, 608, 624, 626 receive compressed air from the air compressors 714, 716 of the compressed air distributors 706, 708 of FIG. 7. The compressed air flow from the air compressor 714 is split and directed at the junction 620 to flow to the fuel cells 606, 608. Additionally, the compressed air flow from the air compressor 716 is split and directed at the junction 640 to flow to the fuel cells 624, 626. In some examples, all of the flow through the junctions 620, 640 can be directed to the fuel cells 606, 624 respectively, while in other examples, all of the flow through the junctions 620, 640 can be directed to the fuel cells 608, 626 respectively.

In the example of FIG. 6, the fuel cells 606, 608, 624, 626 receive hydrogen fuel from the tanks 406, 408, 444, 446 or from the tanks 506, 508, 542, 544 and compressed air flow from the air compressors 714, 716. The fuel cells 606, 608 output electricity to the electric bus 722 while the fuel cells 624, 626 output electricity to the electric bus 724. The electric bus 722 can direct electrical flow between the fuel cells 606, 608, the battery 718, and the electric motor 726. The electric bus 724 can direct electrical flow between the fuel cells 624, 626, the battery 720, and the electric motor 728. When the hydrogen fuel distribution system 300 is functioning, the electric buses 722, 724 direct electrical flow from the fuel cells 606, 608, 624, 626 to the electric motors 726, 728. In some examples, the electric buses 722, 724 draw electrical flow from the batteries 718, 720 to start the fuel cells 606, 608, 624, 626. Additionally, once the fuel cells 606, 608, 624, 626 are producing electricity, the electric buses 722, 724 can divert a portion of the electrical flow to charge the batteries 718, 720 until they reach a desired charge level (e.g., 80% charged). As such, electricity can bidirectionally flow between the batteries 718, 720 and the fuel cells 606, 608, 624, 626.

In the example of FIG. 7, the electric motors 726, 728 receive electrical flow from the electric buses 722, 724 and drive the propulsors 730, 732. In the example of FIG. 7, the propulsors 730, 732 are illustrated as propellers; however, in other examples the propulsors 730, 732 can be any other propulsor apparatus (e.g., helicopter rotor, turbine, etc.). The electric motors 726, 728 include motor control units 734, 736, respectively. The motor control units 734, 736 monitor performance characteristics (e.g., temperature, shaft rotation rate, electrical flow, etc.) of the electric motors 726, 728 and can modulate the output of the electric motors 726, 728. For example, if the motor control units 734, 736 measure a shaft rotation rate greater than desired, the motor control units 734, 736 may communicate with the electric buses 722, 724 to reduce the electrical flow to the electric motors 726, 728.

Figure 8:
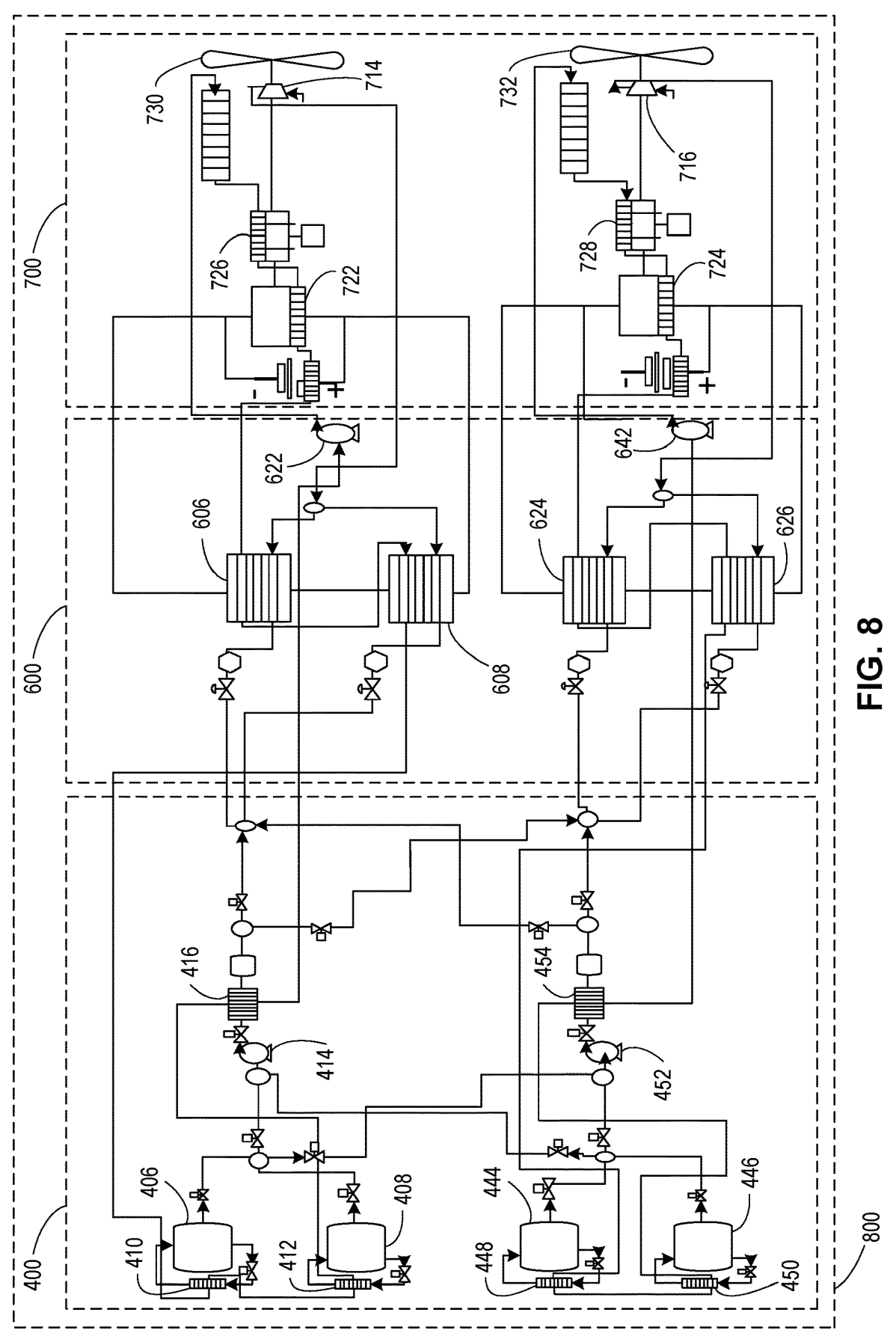
FIG. 8 illustrates an example system diagram of a hydrogen fuel distribution system.

FIG. 8 illustrates an example system diagram of a hydrogen fuel distribution system 800. The hydrogen fuel distribution system 800 is an example implementation of the hydrogen fuel distribution system 300 of FIG. 3. In the example of FIG. 8, the hydrogen fuel distribution system 800 includes the hydrogen fuel storage system 400, the fuel cell stack 600, and the electric propulsor system 700. In some examples, rather than including the hydrogen fuel storage system 400, the hydrogen fuel distribution system 800 includes the hydrogen fuel storage system 500 and its associated elements.

As described in detail in conjunction with FIGS. 4 and 5, the hydrogen fuel storage system 400 manages hydrogen fuel stored in the tanks 406, 408, 444, 446 at pressures greater than a pressure threshold (e.g., 8 Bar, 10 Bar, 11 Bar, 12 Bar, 15 Bar, etc.). As the fuel is stored at pressures greater than the pressure threshold, the hydrogen fuel storage system 400 includes the pumps 414, 452 to circulate the hydrogen fuel through the hydrogen fuel distribution system 800 and through the fuel cell stack 600. In other examples, when the hydrogen fuel distribution system 800 includes the hydrogen fuel storage system 500 rather than the hydrogen fuel storage system 400, the hydrogen fuel is stored in the tanks 506, 508, 542, 544 at pressures less than or equal to the pressure threshold. In this example, the tanks 506, 508, 542, 544 correspond to the tanks 406, 408, 444, 446 of the hydrogen fuel storage system 400, and the pumps 414, 452 are excluded (or deactivated, inactive, etc.) from the hydrogen fuel storage systems 400, 500. To maintain a desired pressure in the hydrogen fuel storage system 400, the thermosiphon loops 410, 412, 448, 450 and the heat exchangers 416, 454 are used for thermal regulation.

As described in detail in conjunction with FIGS. 6 and 7, the fuel cell stack 600 receives hydrogen fuel from the hydrogen fuel storage system 400 and compressed air from the electric propulsor system 700, and outputs electricity from the fuel cells 606, 608, 624, 626 to the electric propulsor system 700. As coolant is pumped through the fuel cell stack 600 by the coolant pumps 622, 642, the fuel cells 606, 608, 624, 626 lose thermal energy to the coolant.

As described in detail in conjunction with FIGS. 6 and 7, the electric propulsor system 700 receives electricity from the fuel cells 606, 608, 624, 626 of the fuel cell stack 600 to power the electric motors 726, 728 to drive the propulsors 730, 732. The air-cooled coolers 710, 712 are integrated into the electric propulsor system 700, which allow circulated coolant to reject thermal energy to the ambient air. In the example of FIG. 8, the electric propulsor system 700 includes the electric buses 722, 724 to direct electrical flow within the electric propulsor system 700. In some examples, compressed air is drawn from the air compressors 714, 716 and provided to the fuel cells 606, 608, 624, 626 of the fuel cell stack 600.

Thus certain examples provide an electrified aircraft controller that operates with the hydrogen fuel distribution system 300, 800, the hydrogen fuel storage system 302, 400, 500, the fuel cell stack 304, 600, and the electric propulsor system 700 to control flow of hydrogen, air, and/or coolant to charge the battery, cool, and provide power. The controller monitors fan rotation (e.g., rotations per minute (RPM), etc.) such that, when the fan rotation is lower than the set value, the motor control unit 734, 736 increases motor current. The controller also monitors the battery 718 720 state of charge (SOC). If the state of charge falls below a set value (e.g., a low limit such as 60-70%, etc.), then one or more of the fuel cells 606, 608, 624, 626 are turned on. The controller can activate hydrogen flow, air flow, and/or coolant flow by activating pump(s) 414, 452, 622, 642, valve(s) 420, 422, 424, 426, 428, 430, 432, 434, 436, 458, 460, 462, 464, 466, 468, 470, 472, 474, 518, 520, 522, 524, 526, 528, 530, 532, 534, 554, 556, 558, 560, 562, 564, 566, 568, 570, 610, 614, 628, 630, etc.

In certain examples, hydrogen flow to the fuel cell(s) 606, 608, 624, 626 can be measured and adjusted by a regulator to match a set value (e.g., a set hydrogen flow threshold or value, etc.). Air flow to the fuel cell(s) 606, 608, 624, 626 can measured and adjusted by a regulator to match a set value (e.g., a set air flow threshold or value, etc.). If the battery state of charge exceeds an upper limit or threshold (e.g., 90%, etc.), then the fuel cell 606, 608, 624, 626 is turned off. Coolant temperature can also be monitored. If the coolant temperature falls below its low set value (e.g., a set coolant temperature threshold or value), the heat exchanger 514, 550 can be bypassed by opening an associated bypass valve 526, 528, 530, 564, 566.

Figure 9:
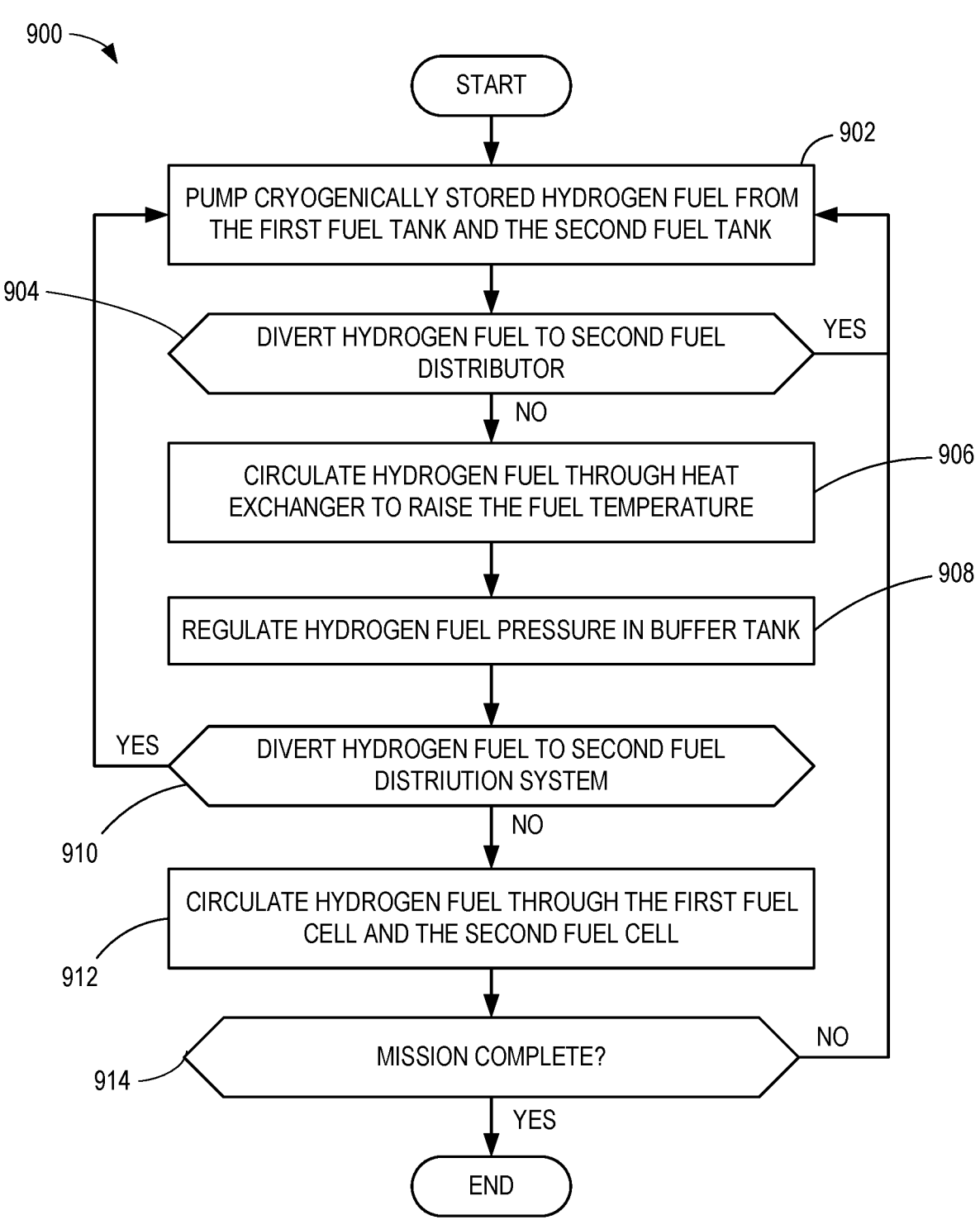
FIG. 9 is a flow diagram of an example implementation of a hydrogen fuel distributor described herein.

FIG. 9 is a flow diagram of an example process 900 to control the hydrogen fuel distributors 402, 404 described herein. The example process 900 can be driven by one or more controllers, such as the first motor control unit 734, the second motor control unit 736, other control unit, etc., which operate one or both hydrogen fuel distributors 402, 404 based on one or more criterion such as state of battery charge (e.g., a low value or limit of 60-70%, etc.) The example process 900 begins with first pumping cryogenically stored hydrogen fuel from the first fuel tank and the second fuel tank to power one or more motors in the electric propulsor system 306 (block 902). In some examples, the pumping of the cryogenically stored hydrogen fuel includes the engagement of the pumps 414, 452 to pump hydrogen fuel from the tanks 406, 408, 444, 446 of FIG. 4. As explained above in conjunction with the example of FIG. 5, if the hydrogen fuel is stored at pressures less than or equal to a pressure threshold (e.g., 8 Bar, 10 Bar, 11 Bar, 12 Bar, 15 Bar, etc.), the pumps 414, 452 may not be included.

At block 904, the controller (e.g., the first motor control unit 734, the second motor control unit 736, other control unit, etc.) determines whether to divert hydrogen fuel from a first hydrogen fuel distributor to a second hydrogen fuel distributor. The determination can be made based on one or more factors including fan rotation, battery state of charge, flight stage (e.g., take off, cruise, landing, etc.), etc. In some examples, the diversion of hydrogen fuel to a second hydrogen fuel distributor includes the splitting of the hydrogen fuel flow at the junction 438 such that a portion of the hydrogen fuel flows through the valve 430 and to the second hydrogen fuel distributor 404. In some examples, if hydrogen fuel is diverted at the junction 438, hydrogen fuel continues to be pumped from the tanks 406, 408 until hydrogen fuel is no longer being diverted. Additionally, the hydrogen fuel distributors 402, 404 can modulate the flow of hydrogen fuel to the fuel cells 606, 608, 624, 626 to meet varying power demands. For example, if the power demand is low, the flow of hydrogen fuel to the fuel cells 606, 608, 624, 626 can be reduced. Conversely, if the power demand is high, the flow of hydrogen fuel to the fuel cells 606, 608, 624, 626 can be increased.

In some examples, these changes in flow can be regulated using the pumps 414, 452. In other examples (e.g., the examples of the hydrogen fuel distributors 502, 504 of FIG. 5), the changes in flow can be regulated using flow regulators (e.g., the valves 522, 524). If the hydrogen fuel flow is decreased at a rate that the pumps 414, 452 cannot meet, the buffer tanks 418, 456 can temporarily store excess hydrogen fuel. In some examples, if the power demand cannot be met by increasing the hydrogen fuel flow to the fuel cells 606, 608, 624, 626, the batteries 718, 720 can temporarily provide additional electrical power to the electric motors 726, 728.

At block 906, hydrogen fuel is circulated through a heat exchanger to raise the hydrogen fuel temperature. In some examples, the circulation of the hydrogen fuel through a heat exchanger includes the pumping of hydrogen fuel by the pumps 414, 452 through the heat exchangers 416, 454 respectively. In other examples, as the hydrogen fuel passes through the heat exchangers 416, 454, the coolant loses thermal energy to the hydrogen fuel.

At block 908, hydrogen fuel pressure in a buffer tank is regulated. In some examples, the buffer tanks 418, 456 regulate (e.g., vary a mass flow rate between a tank inlet and outlet, purge excess pressure, etc.) the hydrogen fuel flow from the heat exchangers 416, 454. In additional examples, the buffer tanks 418, 456 can measure hydrogen fuel characteristics (e.g., a temperature, a pressure, a mass, etc.).

At block 910, hydrogen fuel may be to a second hydrogen fuel distributor. For example, a determination to divert hydrogen fuel to the second hydrogen fuel distributor can be based on a state of charge of the battery 718, 720, fan rotation speed relative to a set value, flight stage, etc. In some examples, the diversion of hydrogen fuel to a second hydrogen fuel distributor includes the splitting of the hydrogen fuel flow at the junction 442 such that a portion of the hydrogen fuel flows through the valve 436 and to the second hydrogen fuel distributor 404. In some examples, if hydrogen fuel is diverted at the junction 442 hydrogen fuel continues to be pumped from the tanks 406, 408 until hydrogen fuel is no longer being diverted.

At block 912, hydrogen fuel is circulated through a first fuel cell and a second fuel cell (block 912). In some examples, the circulation of hydrogen fuel through a first fuel cell and a second fuel cell includes the circulation of hydrogen fuel through the fuel cells 606, 608, 624, 626 of FIG. 6. In some examples, hydrogen fuel flow from the hydrogen fuel distributors 402, 404 is merged at the junctions 618, 638. Hydrogen fuel flowing to the fuel cells 606,

608, 624, 626 can be regulated by the valves 610, 612, 628, 630 and the flowmeters 614, 616, 632, 634.

At block 914, operation of the hydrogen fuel distribution system 300 is evaluated to determine whether the aircraft or flight "mission" is complete (e.g., flight is complete, flight phase or stage is complete, power requirement is met, etc.). The example process 900 includes a mission complete decision (block 914). In some examples, the hydrogen fuel distribution system 300 continues to function and the process 900 returns to block 902. In other examples, the process 900 completes because the hydrogen fuel distribution system 300 is no longer in operation due to mission completion (e.g., completion of flight, flight segment, flight stage, etc.).

FIG. 10 is a flow diagram of an example process 1000 to control the coolant distributors 702, 704 described herein. In certain examples, a controller (e.g., the first motor control unit 734, the second motor control unit 736, other control unit, etc.) monitors battery 718, 720 state of charge, fan rotation, temperature, etc., and determines whether to operate one or both coolant distributors 702, 704. The example process 1000 begins with first circulating coolant using a coolant pump (block 1002). In some examples, the coolant is circulated by the coolant pumps 622, 642 throughout the hydrogen fuel distribution system 300. At block 1004, the coolant temperature is evaluated to determine whether the temperature is below a set value. For example, one or more temperature sensors incorporated into and/or in communication with the controller (e.g., the first motor control unit 734, the second motor control unit 736, other control unit, etc.) can measure coolant temperature. If a measured coolant temperature is below a set temperature value (e.g., 20-24K, 200-240K, etc.), the coolant may be circulated directly into the hydrogen fuel distribution system 300. At block 1006, coolant is circulated through an air-cooled cooler. In some examples, if the coolant temperature is above the set temperature value, the coolant is circulated through an air-cooled cooler to reject thermal energy to the ambient air. In other examples, the coolant may bypass the air-cooled coolers 710, 712 if the coolant is below a set temperature value.

At block 1008, the coolant is circulated through an electric motor and battery. In some examples, the coolant is circulated through, and gains thermal energy from, the electric motors 726, 728, the electric buses 722, 724 and the batteries 718, 720. At block 1010, the coolant is circulated through a series of fuel cells. Following the circulation of the coolant through the batteries 718, 720, the coolant is circulated through the fuel cells 606, 608, 624, 626.

In some examples, the hydrogen fuel distribution system 800 operates in cold weather environments (e.g., temperatures below zero degrees Celsius) and includes a heating element powered by the batteries 718, 720 to increase the thermal energy of the circulated coolant. In this example, the heated coolant circulates around the fuel cells 606, 608, 624, 626 to increase the temperature of the fuel cells 606, 608, 624, 626 above zero degrees Celsius, after which the fuel cells 606, 608, 624, 626 can be started.

At block 1012, the coolant is circulated through a thermosiphon loop to regulate the pressure of hydrogen fuel in a tank. In some examples, the coolant is circulated through the thermosiphon loops 410, 412, 448, 450. The coolant can help regulate the pressure and/or temperature within the tanks 406, 408, 444, 446. At block 1014, coolant is circulated through a heat exchanger to cool hydrogen fuel entering a buffer tank. In some examples, the coolant circulates through the heat exchangers 416, 454, before being pumped through the coolant pumps 622, 642.

At block 1016, operation of the hydrogen fuel distribution system 300 is evaluated to determine whether the aircraft or flight "mission" is complete (e.g., flight is complete, flight phase or stage is complete, power requirement is met, etc.). In some examples, the hydrogen fuel distribution system 300 continues to function and the process 1000 returns to block 1004. In other examples, the process 1000 is no longer in operation due to mission completion (e.g., completion of flight, flight segment, flight stage, etc.).

Figure 11:
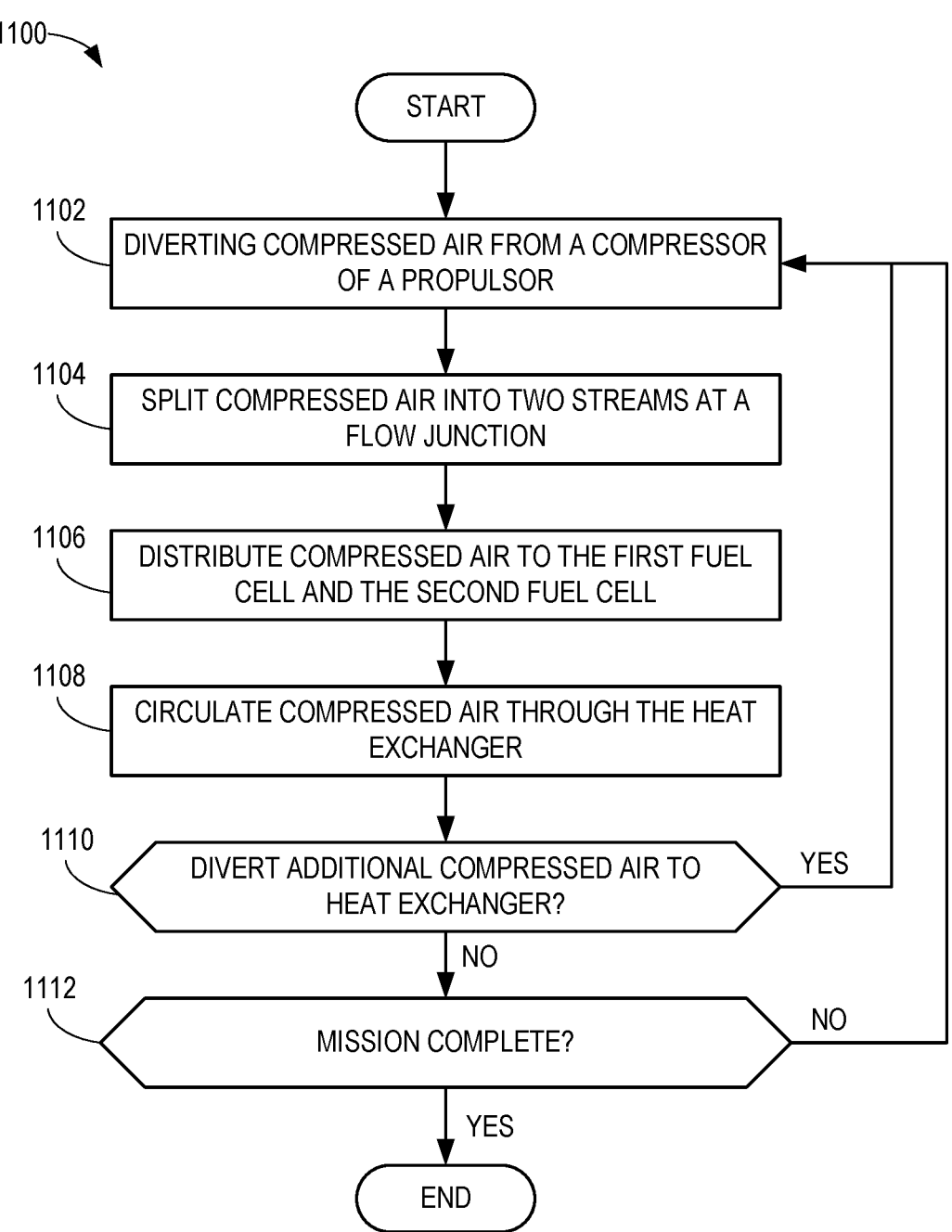
FIG. 11 is a flow diagram of an example implementation of a compressed air distributor described herein.

FIG. 11 is a flow diagram of an example process 1100 to control the compressed air distributors 706, 708 described herein. In certain examples, a controller (e.g., the first motor control unit 734, the second motor control unit 736, other control unit, etc.) monitors battery 718, 720 state of charge, fan rotation, temperature, etc., and determines whether to operate one or both compressed air distributors 706, 708. The example process 1100 begins with first diverting compressed air from a compressor of a propulsor (block 1102). In some examples, compressed air is diverted from the compressed air distributors 706, 708 to be circulated throughout the hydrogen fuel distribution system 300. Additionally, at block 1104, the compressed air is split into two streams at a flow junction. In some examples, the compressed air stream is split at the junction 620 to be sent to the fuel cells 606, 608 and split at the junction 640 to be sent to the fuel cells 624, 626.

At block 1106, the compressed air is distributed to the first fuel cell and the second fuel cell. In some examples, the compressed air flow, once split at the junctions 620, 640, is distributed to the fuel cells 606, 608 and the fuel cells 624, 626 from the junction 620 and the junction 640 respectively.

At block 1108, compressed air is circulated through a heat exchanger. For example, compressed air is circulated through the heat exchangers 416, 454 for temperature regulation. At block 1110, more compressed air can be diverted to the heat exchanger. For example, control can revert to block 1102 for additional compressed air to be diverted from the compressed air distributors 706, 708.

At block 1112, operation of the hydrogen fuel distribution system 300 is evaluated to determine whether the aircraft or flight "mission" is complete (e.g., flight is complete, flight phase or stage is complete, power requirement is met, etc.). In some examples, the hydrogen fuel distribution system 300 continues to function and the process 1100 returns to block 1102. In other examples, the process 1100 is no longer in operation due to mission completion (e.g., completion of flight, flight segment, flight stage, etc.).

Figure 12:
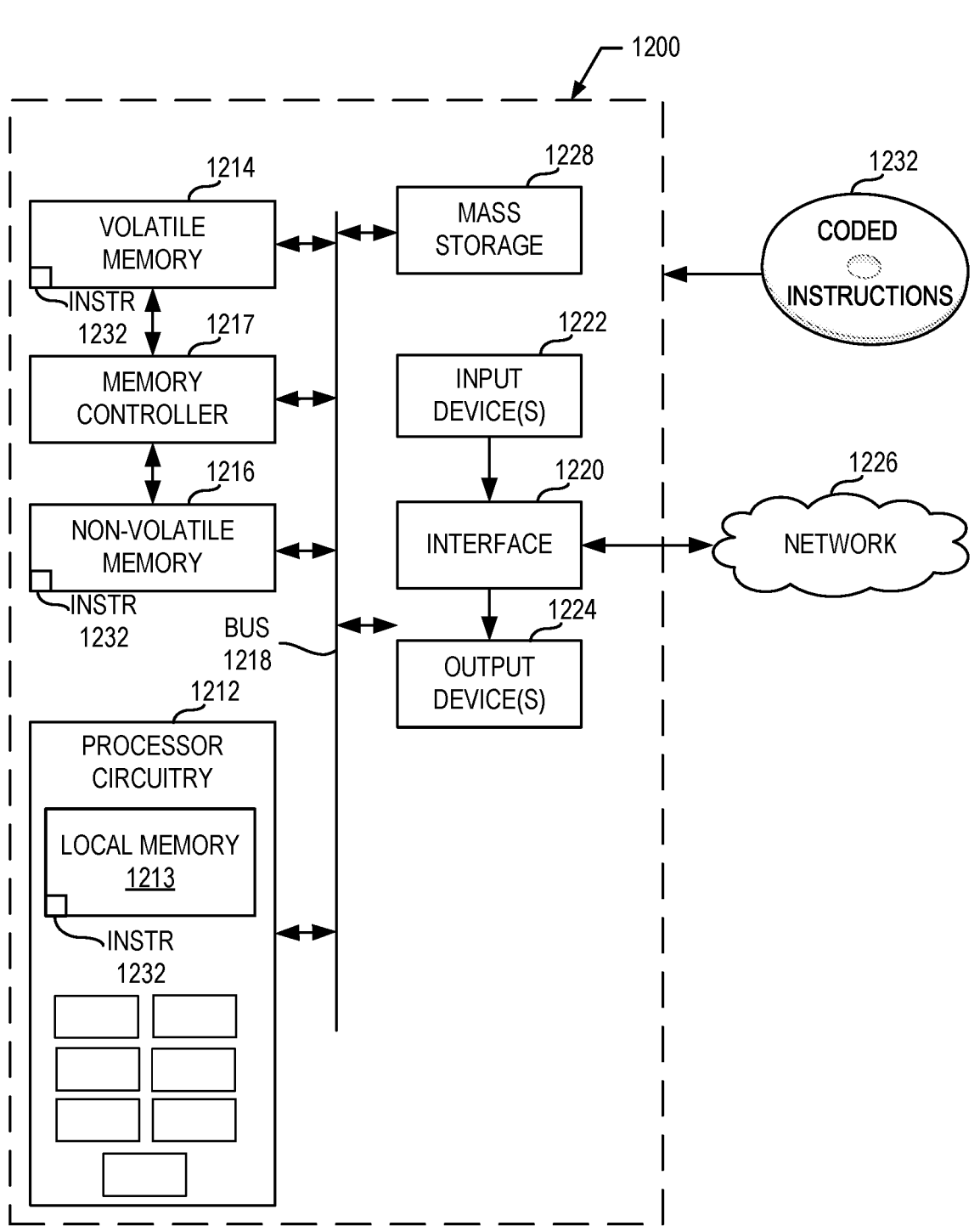
FIG. 12 is a block diagram of an example processing platform to implement one or more controllers of the hydrogen fuel distribution system to execute the processes of FIGS. 9-11.

FIG. 12 is a block diagram of an example processor platform 1200 structured to execute and/or instantiate the machine-readable instructions and/or operations of FIGS. 9-11 to operate the apparatus of the hydrogen fuel distributors 402, 404, 502, 504, the coolant distributors 702, 704, and the compressed air distributors 706, 708. The processor platform 1200 can be, for example, a server, a personal computer, a workstation, a self-learning machine (e.g., a neural network), a mobile device (e.g., a cell phone, a smart phone, a tablet such as an iPad™), or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the junctions 438, 440, 442, 476, 478, 480, 536, 538, 540, 572, 574, 576, 618, 620, 638, 640, the valves 420-436, 458-474, 518-534, 554-570, 610, 612, 628, 630, the pumps 414, 452 and the coolant pumps 622, 642, the flowmeters 614, 616, 632, 634, and the electric buses 722, 724.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, a keyboard, a button, a mouse, a touchscreen, and/or a track-pad, One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), and/or an in-place switching (IPS) display, a touchscreen, etc.). The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine-readable instructions of FIGS. 9, 10, and 11, may be stored in the mass storage device 1228, in the volatile memory 1214, in the non-volatile memory

1216, and/or on a removable non-transitory computer readable storage medium such as a CD or DVD.

From the foregoing, it will be appreciated that example systems, methods, apparatus, and articles of manufacture have been disclosed that integrate thermal management into a hydrogen fuel distribution system. In some examples described herein, a hydrogen fuel distribution system includes hydrogen fuel stored in cryogenic tanks where the pressure and/or temperature within the tanks is monitored and modulated by thermosiphon loops containing coolant. As described herein, the coolant circulates through various elements of the hydrogen fuel distribution system while gaining and losing thermal energy. For example, the coolant circulates through heat exchangers, fuel cells, batteries, electric buses, electric motors, and air-cooled coolers of the hydrogen fuel distribution system. The air-cooled coolers allow thermal energy to be ejected from the coolant to the ambient air.

In further examples, hydrogen fuel is circulated independently from a number of hydrogen fuel distributors throughout the hydrogen fuel distribution system to a number of fuel cells. By integrating thermal management apparatus such as coolant circulation and air-cooled coolers with hydrogen fuel distributors of a hydrogen fuel distribution system, the heating capacity of the system elements such as the electric motor and fuel cells is utilized while the cooling capacity of the ambient air and the cryogenically stored hydrogen fuel is also utilized. As such, cooling of hydrogen using ambient air can be leveraged to alleviate load on the air-cooled cooler. Furthermore, the redundancy of duplicate system elements and the independent distribution of hydrogen fuel between hydrogen fuel distributors allows for increased reliability of operation.

Further aspects of the present disclosure are provided by the subject matter of the following clauses:

Example 1 includes a fuel distribution system with integrated thermal management including a hydrogen fuel distributor including a first tank and a second tank, the first tank and the second tank fluidly coupled to a first fuel cell and a second fuel cell, a coolant distributor including air-cooled coolers thermally coupled to the first fuel cell and the second fuel cell, a compressed air distributor coupled to a propulsor, the first fuel cell, and the second fuel cell, and an electrical distributor electrically coupled to the first fuel cell, the second fuel cell, and an electric motor, the electric motor to drive the propulsor.

Example 2 includes the fuel distribution system of any preceding clause, wherein the first tank of the hydrogen fuel distributor has a first thermosiphon loop, and the second tank of the hydrogen fuel distributor has a second thermosiphon loop, where the first thermosiphon loop and the second thermosiphon loop are connected with the coolant distributor.

Example 3 includes the fuel distribution system of any preceding clause, wherein the electrical distributor is further connected to a battery, an electric bus, and a motor control unit.

Example 4 includes the fuel distribution system of any preceding clause, wherein the hydrogen fuel distributor includes a fuel pump to pump hydrogen fuel when a first pressure in the first tank and a second pressure in the second tank are below a pressure threshold.

Example 5 includes the fuel distribution system of any preceding clause, wherein, when the first pressure in the first tank and the second pressure in the second tank are above the pressure threshold, the fuel pump is inactive.

Example 6 includes the fuel distribution system of any preceding clause, wherein at least one of air-cooled coolers is integrated with a nacelle of the propulsor and receives a circulated coolant.

Example 7 includes the fuel distribution system of any preceding clause, wherein the hydrogen fuel distributor includes a buffer tank, the buffer tank to regulate a fuel pressure from an output of the first tank and the second tank.

Example 8 includes a fuel distribution system with integrated thermal management including a first fuel tank and a second fuel tank, where the first fuel tank and the second fuel tank are fluidly connected to transfer hydrogen fuel between the first fuel tank and the second fuel tank, a first fuel cell and a second fuel cell fluidly connected to the first fuel tank and the second fuel tank where the first fuel cell and the second fuel cell provide electrical power to a battery, an air-cooled cooler coupled to the first fuel cell and the second fuel cell, the air-cooled cooler to eject excess heat from a circulated coolant to the ambient air, a propulsor driven by an electric motor, the electric motor powered by the first fuel cell and the second fuel cell.

Example 9 includes the fuel distribution system of any preceding clause, wherein the air-cooled cooler is integrated into a nacelle of the propulsor.

Example 10 includes the fuel distribution system of any preceding clause, further including a bypass valve to bypass the air-cooled cooler when a temperature of the circulated coolant drops below a set value.

Example 11 includes the fuel distribution system of any preceding clause, wherein a coolant pump circulates coolant through the fuel distribution system.

Example 12 includes the fuel distribution system of any preceding clause, wherein the first fuel cell and the second fuel cell are electrically coupled to the battery such that electricity bidirectionally flows between the battery and the first fuel cell and the second fuel cell.

Example 13 includes the fuel distribution system of any preceding clause, wherein the first fuel tank and the second fuel tank are connected to a second fuel distribution system where fuel can be shifted to and from the fuel distribution system and the second fuel distribution system.

Example 14 includes the fuel distribution system of any preceding clause, wherein the first fuel cell and the second fuel cell receive compressed air from the propulsor.

Example 15 includes an apparatus for managing a fuel distribution system with integrated thermal management, the apparatus including at least one memory, instructions in the apparatus, and processor circuitry to execute the instructions to monitor and adjust a fuel flow to a first fuel cell and a second fuel cell to meet a first set value where the fuel flow is monitored by a flowmeter, monitor and adjust a propulsor rotation rate where a motor control unit increases or decreases electrical flow to a propulsor based on a second set value, monitor and adjust a circulated coolant temperature where a circulated coolant passes through an air-cooled cooler to lower the circulated coolant temperature when the circulated coolant rises above a third set value, maintain a battery charge based on a fourth set value by diverting electricity to a batter from the first fuel cell and the second fuel cell, and divert and adjust a compressed airflow where the compressed airflow is diverted at a first junction.

Example 16 includes the apparatus of any preceding clause, wherein the instructions, when executed, cause the processor circuitry to at least one of open or close a set of valves to increase or decrease the fuel flow to the first fuel cell and the second fuel cell.

Example 17 includes the apparatus of any preceding clause, wherein the instructions, when executed, cause the processor circuitry to modulate the junction to split and direct the compressed airflow between the first fuel cell and the second fuel cell.

Example 18 includes the apparatus of any preceding clause, wherein the instructions, when executed, cause the processor circuitry to control a second junction to merge fuel flow from a first fuel tank and a second fuel tank.

Example 19 includes the apparatus of any preceding clause, wherein the instructions, when executed, cause the processor circuitry to control a set of valves to control the fuel flow between the first fuel tank and the second fuel tank and a second fuel distribution system.

Example 20 includes the apparatus of any preceding clause, wherein the instructions, when executed, cause the processor circuitry to circulate a hydrogen fuel through a heat exchanger, the heat exchanger to thermosiphon the hydrogen fuel to maintain a pressure in the first fuel tank and the second fuel tank.

Example 21 includes an apparatus to distribute hydrogen fuel comprising means for storing hydrogen fuel and means for regulating the pressure within the means for storing hydrogen fuel.

Example 22 includes the apparatus of any preceding clause wherein the means for storing hydrogen fuel includes a tank.

Example 23 includes the apparatus of any preceding clause wherein the means for regulating the means for storing includes a thermosiphon loop.

Example 24 includes the apparatus of any preceding clause wherein the means for regulating is fluidly connected with the means for storing.

Example 25 includes an apparatus to distribute compressed air comprising an air compressor and a junction, where the junction directs a compressed air between a first fuel cell and a second fuel cell.

Example 26 includes the apparatus of any preceding clause wherein the compressed air is diverted to flow to a heat exchanger.

Example 27 includes an apparatus to provide electricity to an electric motor comprising a first hydrogen fuel tank, a second hydrogen fuel tank, a first fuel cell, and a second fuel cell.

Example 28 includes the apparatus of any preceding clause wherein the first fuel cell and the second fuel cell are redundant to each other.

Example 29 includes the apparatus of any preceding clause wherein electricity is provided to the electric motor from the first fuel cell and the second fuel cell.

Example 30 includes the apparatus of any preceding clause wherein the first hydrogen fuel tank and the second hydrogen fuel tank are redundant to each other.

Example 31 includes the apparatus of any preceding clause wherein hydrogen fuel can flow from the first hydrogen fuel tank to the first fuel cell and the second fuel cell.

Example 32 includes the apparatus of any preceding clause wherein hydrogen fuel can flow from the second hydrogen fuel tank to the first fuel cell and the second fuel cell.

Example 33 includes a method for managing a fuel distribution system with integrated thermal management, the method comprising monitoring and adjusting a fuel flow to a first fuel cell and a second fuel cell to meet a set value, the fuel flow monitored by a flowmeter, monitoring and adjusting a propulsor rotation rate, a motor control unit to increase or decrease electrical flow to a propulsor based on a set value, monitoring and adjusting a circulated coolant temperature, a circulated coolant to pass through an air-cooled cooler to lower the circulated coolant temperature when the circulated coolant rises above a set temperature value, maintaining a battery charge based on a set value by diverting electricity to a battery from the first fuel cell and the second fuel cell, and diverting and adjusting a compressed airflow, the compressed airflow diverted at a junction.

Example 34 includes the method of any preceding clause further including at least one of opening or closing a set of valves (610, 612) to increase or decrease the fuel flow to the first fuel cell (606) and the second fuel cell (608).

Example 35 includes the method of any preceding clause further including modulating a junction to split and direct the compressed airflow between the first fuel cell and the second fuel cell.

Example 36 includes the method of any preceding clause further including modulating a junction to merge fuel flow from a first fuel tank and a second fuel tank.

Example 37 includes the method of any preceding clause further including utilizing a set of valves to control the fuel flow between the first fuel tank and the second fuel tank and a second fuel distributor.

Example 38 includes the method of any preceding clause further including circulating a hydrogen fuel through a first thermosiphon loop and a second thermosiphon loop, the first thermosiphon loop and the second thermosiphon loop to thermosiphon the hydrogen fuel to maintain a pressure in the first fuel tank and the second fuel tank respectively.

Example 39 includes the apparatus of any preceding clause wherein cryogenically stored hydrogen fuel is pumped from a first tank and a second tank, the hydrogen fuel to be circulated through a first fuel cell and a second fuel cell.

Example 40 includes the apparatus of any preceding clause wherein hydrogen fuel is diverted to flow from a first hydrogen fuel distributor to a second hydrogen fuel distributor.

Example 41 includes the apparatus of any preceding clause wherein a temperature of the hydrogen fuel is regulated with a heat exchanger, a pressure of the hydrogen fuel to be regulated in a buffer tank.

Example 42 includes the apparatus of any preceding clause wherein coolant is circulated with a coolant pump throughout an air-cooled cooler, an electric motor, an electric bus, a battery, fuel cells, a thermosiphon loop, and a heat exchanger.

Example 43 includes the apparatus of any preceding clause wherein compressed air is diverted from a compressor of a propulsor and split at a junction to flow to a first fuel cell and a second fuel cell.

Example 44 includes the apparatus of any preceding clause wherein compressed air is circulated from a compressor of a propulsor through a heat exchanger.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A fuel distribution system with integrated thermal management, the fuel distribution system comprising:
   a hydrogen fuel distributor including a first tank and a second tank, the first tank and the second tank fluidly coupled to a first fuel cell and a second fuel cell;
   a coolant distributor including air-cooled coolers thermally coupled to the first fuel cell and the second fuel cell;
   a compressed air distributor coupled to a propulsor, the first fuel cell, and the second fuel cell; and
   an electrical distributor electrically coupled to the first fuel cell, the second fuel cell, and an electric motor, the electric motor to drive the propulsor.

2. The fuel distribution system of claim 1, wherein the first tank of the hydrogen fuel distributor has a first thermosiphon loop, and the second tank of the hydrogen fuel distributor has a second thermosiphon loop, the first thermosiphon loop and the second thermosiphon loop connected with the coolant distributor.

3. The fuel distribution system of claim 1, wherein the electrical distributor is further connected to a battery, an electric bus, and a motor control unit.

4. The fuel distribution system of claim 1, wherein the hydrogen fuel distributor includes a fuel pump to pump the hydrogen fuel when a first pressure in the first tank and a second pressure in the second tank are below a pressure threshold.

5. The fuel distribution system of claim 4, wherein, when the first pressure in the first tank and the second pressure in the second tank are above the pressure threshold, the fuel pump is inactive.

6. The fuel distribution system of claim 1, wherein at least one of the air-cooled coolers is integrated with a nacelle of the propulsor and receives a circulated coolant.

7. The fuel distribution system of claim 1, wherein the hydrogen fuel distributor includes a buffer tank to regulate a fuel pressure from an output of the first tank and the second tank.

8. A fuel distribution system with integrated thermal management comprising:
   a first fuel tank and a second fuel tank, the first fuel tank and the second fuel tank fluidly connected to transfer hydrogen fuel between the first fuel tank and the second fuel tank;
   a first fuel cell and a second fuel cell fluidly connected to the first fuel tank and the second fuel tank, the first fuel cell and the second fuel cell to provide electrical power to a battery;
   an air-cooled cooler coupled to the first fuel cell and the second fuel cell, the air-cooled cooler to eject excess heat from a circulated coolant to an ambient air; and
   a propulsor driven by an electric motor, the electric motor powered by the first fuel cell and the second fuel cell.

9. The fuel distribution system of claim 8, wherein the air-cooled cooler is integrated into a nacelle of the propulsor.

10. The fuel distribution system of claim 8, further including a bypass valve to bypass the air-cooled cooler when a temperature of the circulated coolant drops below a set value.

11. The fuel distribution system of claim 10, wherein a coolant pump circulates coolant through the fuel distribution system.

12. The fuel distribution system of claim 8, wherein the first fuel cell and the second fuel cell are electrically coupled to the battery such that electricity bidirectionally flows between the battery and the first fuel cell and the second fuel cell.

13. The fuel distribution system of claim 8, wherein the first fuel tank and the second fuel tank are connected to a second fuel distribution system where fuel can be shifted to and from the fuel distribution system and the second fuel distribution system.

14. The fuel distribution system of claim 8, wherein the first fuel cell and the second fuel cell receive compressed air from the propulsor.

15. An apparatus for managing a fuel distribution system with integrated thermal management, the apparatus comprising:
   at least one memory;
   instructions in the apparatus; and
   processor circuitry to execute the instructions to:
      monitor and adjust a fuel flow to a first fuel cell and a second fuel cell to meet a first set value, the fuel flow monitored by a flowmeter;
      monitor and adjust a propulsor rotation rate, a motor control unit to increase or decrease electrical flow to a propulsor based on a second set value;
      monitor and adjust a circulated coolant temperature, a circulated coolant to pass through an air-cooled cooler to lower the circulated coolant temperature when the circulated coolant rises above a third set value;
      maintain a battery charge based on a fourth set value by diverting electricity to a battery from the first fuel cell and the second fuel cell; and
      divert and adjust a compressed airflow, the compressed airflow diverted at a first junction.

16. The apparatus of claim 15, wherein the instructions, when executed, cause the processor circuitry to open or close a set of valves to increase or decrease the fuel flow to the first fuel cell and the second fuel cell.

17. The apparatus of claim 15, wherein the instructions, when executed, cause the processor circuitry to modulate the junction to split and direct the compressed airflow between the first fuel cell and the second fuel cell.

18. The apparatus of claim 15, wherein the instructions, when executed, cause the processor circuitry to control a second junction to merge fuel flow from a first fuel tank and a second fuel tank.

19. The apparatus of claim 18, wherein the instructions, when executed, cause the processor circuitry to control a set of valves to control the fuel flow between the first fuel tank and the second fuel tank and a second fuel distribution system.

20. The apparatus of claim 18, wherein the instructions, when executed, cause the processor circuitry to circulate a hydrogen fuel through a heat exchanger, the heat exchanger to thermosiphon the hydrogen fuel to maintain a pressure in the first fuel tank and the second fuel tank.

* * * * *